United States Patent
Sawaf

(10) Patent No.: US 10,452,786 B2
(45) Date of Patent: Oct. 22, 2019

(54) USE OF STATISTICAL FLOW DATA FOR MACHINE TRANSLATIONS BETWEEN DIFFERENT LANGUAGES

(71) Applicant: PayPal, Inc., San Jose, CA (US)

(72) Inventor: Hassan Sawaf, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 268 days.

(21) Appl. No.: 14/584,925

(22) Filed: Dec. 29, 2014

(65) Prior Publication Data

US 2016/0188575 A1 Jun. 30, 2016

(51) Int. Cl.
*G06F 17/28* (2006.01)

(52) U.S. Cl.
CPC ........ *G06F 17/289* (2013.01); *G06F 17/2854* (2013.01)

(58) Field of Classification Search
None
See application file for complete search history.

(56) References Cited

U.S. PATENT DOCUMENTS

| | | | |
|---|---|---|---|
| 7,788,276 B2 | 8/2010 | Peng et al. | |
| 8,438,178 B2* | 5/2013 | Ismalon | G06Q 30/02 707/765 |
| 8,543,580 B2 | 9/2013 | Chen et al. | |
| 8,572,109 B1* | 10/2013 | Hodge | G06F 16/58 707/760 |
| 8,577,910 B1 | 11/2013 | Hodge et al. | |
| 8,756,050 B1* | 6/2014 | Harkness | G06F 17/289 704/1 |
| 8,793,120 B1 | 7/2014 | Fliedner et al. | |
| 2007/0067154 A1* | 3/2007 | Ryan, III | G06F 17/289 704/8 |
| 2007/0250306 A1* | 10/2007 | Marcu | G06F 17/2827 704/9 |
| 2008/0262827 A1* | 10/2008 | DeGroot | G06F 17/2827 704/3 |
| 2009/0024613 A1* | 1/2009 | Niu | G06F 16/3338 |
| 2009/0055380 A1* | 2/2009 | Peng | G06F 16/374 |
| 2009/0326912 A1* | 12/2009 | Ueffing | G06F 17/2818 704/2 |

(Continued)

OTHER PUBLICATIONS

International Search Report and Written Opinion for PCT/US2015/063514 dated Feb. 12, 2016.

(Continued)

*Primary Examiner* — Thuykhanh Le
(74) *Attorney, Agent, or Firm* — Haynes and Boone, LLP

(57) ABSTRACT

In a flow of computer actions, a computer system (110) receives a request involving a machine translation. In performing the translation (160, 238), or in using the translation in subsequent computer operations (242, 1110), the computer system takes into account known statistical relationships (310), obtained from previously accumulated click-through data (180), between a machine translation performed in a flow, the flow's portions preceding the translation, and success indicators pertaining to the flow's portion following the translation. The statistical relationships are derived by data mining of the click-through data. Further, normal actions can be suspended to use a random option to accumulate the click-through data and/or perform statistical AB testing. Other features are also provided.

36 Claims, 11 Drawing Sheets

(56) References Cited

U.S. PATENT DOCUMENTS

| | | | |
|---|---|---|---|
| 2010/0057438 A1* | 3/2010 | Zhanyi | G06F 17/2827 704/4 |
| 2010/0138213 A1 | 6/2010 | Bicici et al. | |
| 2010/0161642 A1* | 6/2010 | Chen | G06F 16/951 707/759 |
| 2010/0179803 A1 | 7/2010 | Sawaf et al. | |
| 2010/0274606 A1* | 10/2010 | Fain | G06Q 30/06 705/50 |
| 2011/0055008 A1* | 3/2011 | Feuerstein | G06Q 30/02 705/14.51 |
| 2011/0055699 A1* | 3/2011 | Li | G06F 16/951 715/709 |
| 2011/0066577 A1 | 3/2011 | Van Gael et al. | |
| 2011/0082684 A1* | 4/2011 | Soricut | G06F 17/289 704/2 |
| 2011/0087680 A1* | 4/2011 | Murdock | G06Q 30/02 707/749 |
| 2011/0258229 A1 | 10/2011 | Ni et al. | |
| 2011/0270672 A1* | 11/2011 | Hillard | G06Q 30/02 705/14.42 |
| 2012/0030276 A1* | 2/2012 | Narayanan | G06F 16/958 709/203 |
| 2012/0233196 A1* | 9/2012 | Wu | G06F 16/24522 707/760 |
| 2012/0254218 A1* | 10/2012 | Ali | G06F 16/3338 707/765 |
| 2012/0323554 A1* | 12/2012 | Hopkins | G06F 17/2818 704/2 |
| 2013/0007207 A1* | 1/2013 | Dietrich | G06F 16/183 709/217 |
| 2013/0103493 A1* | 4/2013 | Gao | G06Q 10/10 705/14.46 |
| 2013/0124492 A1* | 5/2013 | Gao | G06F 17/273 707/706 |
| 2013/0251248 A1 | 9/2013 | Guo et al. | |
| 2014/0081618 A1* | 3/2014 | Kim | G06F 17/289 704/2 |
| 2014/0101201 A1 | 4/2014 | Yan et al. | |
| 2014/0149102 A1 | 5/2014 | Marcu et al. | |
| 2014/0163951 A1 | 6/2014 | Nikoulina et al. | |
| 2014/0164164 A1 | 6/2014 | Rabenold et al. | |
| 2014/0164352 A1 | 6/2014 | Denninghoff | |
| 2014/0181146 A1 | 6/2014 | Jamthe et al. | |
| 2014/0188462 A1 | 7/2014 | Zadeh | |
| 2014/0350931 A1* | 11/2014 | Levit | G10L 15/063 704/243 |
| 2014/0379329 A1* | 12/2014 | Dong | G06F 17/2775 704/9 |
| 2015/0134319 A1* | 5/2015 | Chelly | G06F 16/334 704/2 |
| 2015/0248400 A1* | 9/2015 | Sawaf | G06F 16/903 704/2 |

OTHER PUBLICATIONS

Tan P. N., Kumar V., Srivastav J., "Selecting the right interestingness measure for association patterns", 8th ACM SIGKDD International Conference on KDD, 2001, San Francisco USA 67-76.
V. Umarani, Dr. M. Punithavalli, "A Study on Effective Mining of Association Rules From Huge Databases", IJCSR International Journal of Computer Science and Research, vol. 1 Issue 1, 2010 ISSN: 2210-9668.
S.M. Kamruzzaman, Farhana Haider, Ahmed Ryadh Hasan, "Text Classification Using Data Mining", ICTM 2005, available on the Internet at http://arxiv.org/pdf/1009.4987.pdf.
Navin Kumar Tyagi, A. K. Solanki, "Prediction of Users Behavior through Correlation Rules", (IJACSA) International Journal of Advanced Computer Science and Applications, vol. 2, No. 9, 2011, pp. 77-81, available at http://www.thesai.org/downloads/Volume2No9/Paper%2013%20-%20Prediction%20of%20Users%20Behavior%20through%20Correlation%20Rules.pdf.
Eytan Adar, Daniel S. Weld, Brian N. Bershad, Steven D. Gribble, "Why We Search: Visualizing and Predicting User Behavior", Copyright is held by the International World Wide Web Conference, Committee (IW3C2); WWW 2007, May 8-12, 2007, Banff, Alberta, Canada. ACM 978-1-59593-654-07/07/0005. available at http://www.cond.org/www520-adar.pdf.
Eugene Agichtein, Eric Brill, Susan Dumais, "Improving Web Search Ranking by Incorporating User Behavior Information", SIGIR'06, Aug. 6-11, 2006, Seattle, Washington, USA; Copyright 2006 ACM 1-59593-369-7/06/0008; available at http://www.mathcs.emory.edu/~eugene/papers/sigir2006ranking.pdf.
Adriano V. Barbosa, Martin A. Oberg, Rose-Marie Déchaine, Eric Vatikiotis-Bateson, "An Instantaneous Correlation Algorithm for Assessing Intra and Inter Subject Coordination During Communicative Behavior", Workshop on Modeling Human Communication Dynamics at NIPS 2010, pp. 38-41. Available at http://projects.ict.usc.edu/mhcd2010/hcd-barbosa.pdf.
Dong Wang, Weizhu Chen, Gang Wang, Yuchen Zhang, Botao Hu, "Explore Click Models for Search Ranking", CIKM'10, Oct. 26-30, 2010, Toronto, Ontario, Canada. Copyright 2010 ACM 978-1-4503-0099-5/10/10. Available at http://www.cs.berkeley.edu/~yuczhang/files/cikm10_ranking.pdf.
Steve Fox, Kuldeep Karnawat, Mark Mydland, Susan Dumais, and Thomas White, "Evaluating Implicit Measures to Improve Web Search", pulled before Dec. 21, 2014. Available at http://research.microsoft.com/en-us/um/people/sdumais/cbarticle-final.pdf.
Sandeep Pandey, Mohamed Aly, Abraham Bagherjeiran, Andrew Hatch, Peter Ciccolo, Adwait Ratnaparkhi, Martin Zinkevich, "Learning to Target: What Works for Behavioral Targeting", CIKM'11, Oct. 24-28, 2011, Glasgow, Scotland, UK. Copyright 2011 ACM 978-1-4503-0717-8/11/10. Available at http://labs.yahoo.com/files/learning%20to%20target.pdf.
Andrii Shelestov, Serhiy Skakun, Olga Kussul, "Complex Neural Network Model of User Behavior in Distributed Systems", International Conference ,<<Knowledge-Dialogue-Solutions>> 2007. Available at http://inform.ikd.kiev.ua/content/ua/publications/articles/content/KDS07-Shelestov_Skakun_Kussul.pdf.
Pao-Hua Chou, Pi-Hsiang Li, Kuang-Ku Chen, Menq-Jiun Wu, "Integrating web mining and neural network for personalized e-commerce automatic service", Expert Systems with Applications 37 (2010) 2898-2910. Available at http://csnotes.upm.edu.my/kelasmaya/pgkm20910.nsf/de8cc2082fc4d31b4825730e002bd111.1f41e6ddc7f55f6b482577760014ca84/$FILE/WEB-MINING-E-COMMERCE-2010.pdf.
Sreerupa Das et al., "A Unified Gradient-Descent/Clustering Architecture for Finite State Machine Induction", NIPS, pp. 19-26, 1993.
Jianfeng Gao et al., "Clickthrough-Based Translation Models for Web Search: from Word Models to Phrase Models", CIKM'10, Oct. 26-29, 2010, Toronto, Ontario, Canada.
DFA minimization—Wikipedia, http://en.wikipedia.org/wiki/DFA-minimization, retrieved on Jun. 27, 2014.
Dilek Hakkani-Tur et al., "Translating Natural Language Utterances to Search Queries for SLU Domain Detection Using Query Click Logs", ICASSP, IEEE, pp. 4953-4956, 2012.
Thorsten Joachims, "Optimizing Search Engines Using Clickthrough Data", SIGKDD 02, Edmonton, Alberta, Canada, 2002.
On-Demand Web Analytics, WebSideStory, "Use of Key Performance Indicators in Web Analytics", 11 pgs, 2004.
Sven Seuken et al., "Market User Interface Design", EC'12, Jun. 4-8, 2012, Valencia, Spain, pp. 898-915, 2012.
C. Perlich et al., "Machine learning for targeted display advertising: Transfer learning action", Mcahine Learning, vol. 95, Issue 1, pp. 103-127, Apr. 2014.
K. Duh, "Learning to Rank with Partially-Labeled Data", Dissertation, University of Washington, 2009.
R. Katz, *Contemporary Logic Design*, Chapter #9: Finite State Machine Optimization, University of California, Berkeley, Jul. 1993.
Zheng Zeng et al., "Learning Finite State Machines With Self-Clustering Recurrent Networks", Neural Computation, 5, 976-990, 1993.

(56) References Cited

OTHER PUBLICATIONS

R. Kummerle et al., "g²o: A General Framework for Graph Optimization", IEEE International Conference on Robotics and Automation (ICRA), 2011.
Machine learning—Wikipedia, http://en.wikipedia.org/wiki/Machine_learning, retrieved on Jun. 17, 2014.
Deep learning—Wikipedia, http://en.wikipedia.org/wiki/Deep_learning, retrieved on Jun. 17, 2014.
Machine translation—Wikipedia, http://en.wikipedia.org/wiki/Machine_translation, retrieved on Jun. 17, 2014.

* cited by examiner

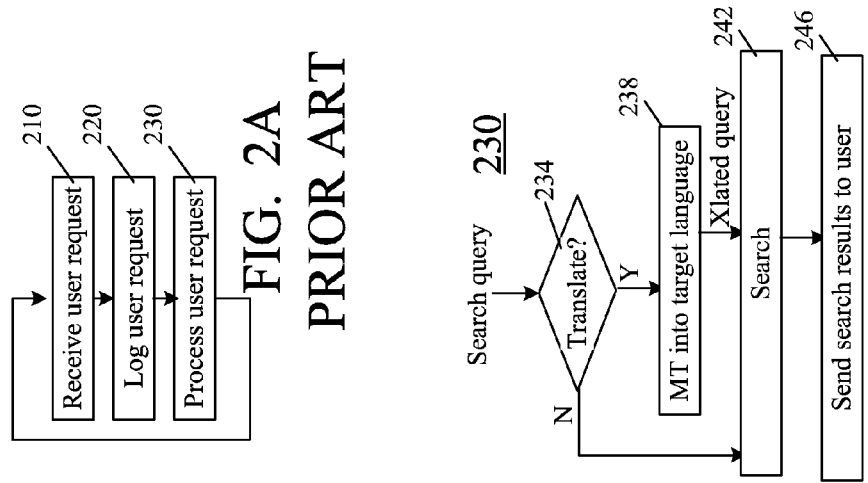
FIG. 2A PRIOR ART
FIG. 2B PRIOR ART
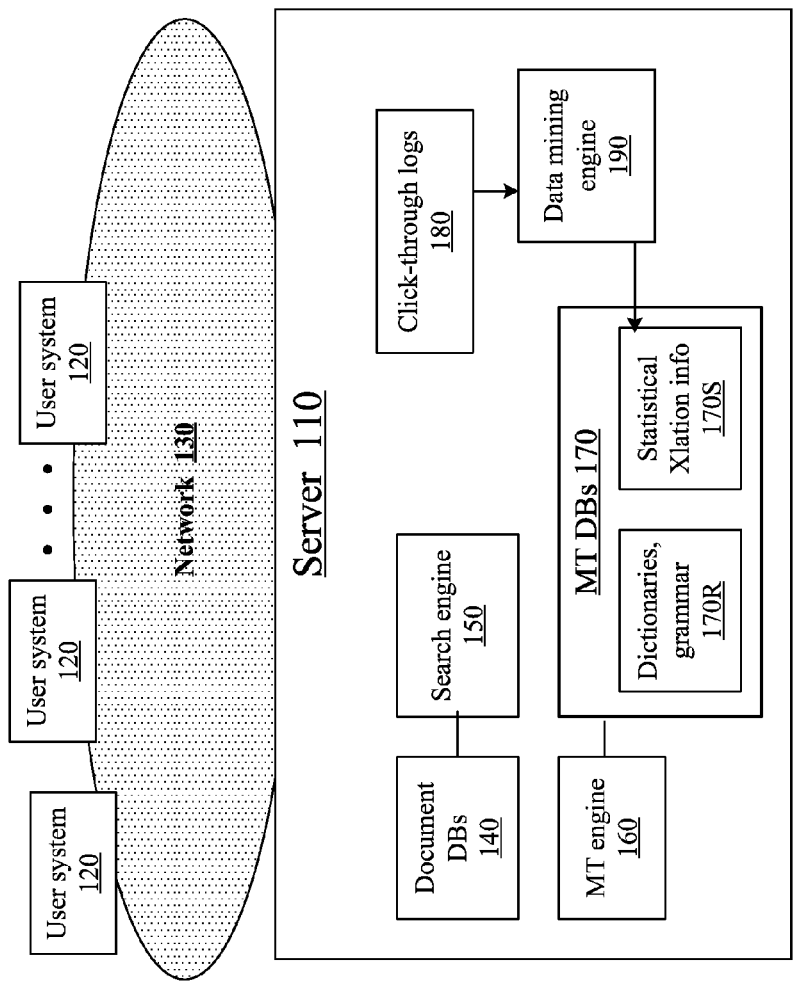
FIG. 1 PRIOR ART

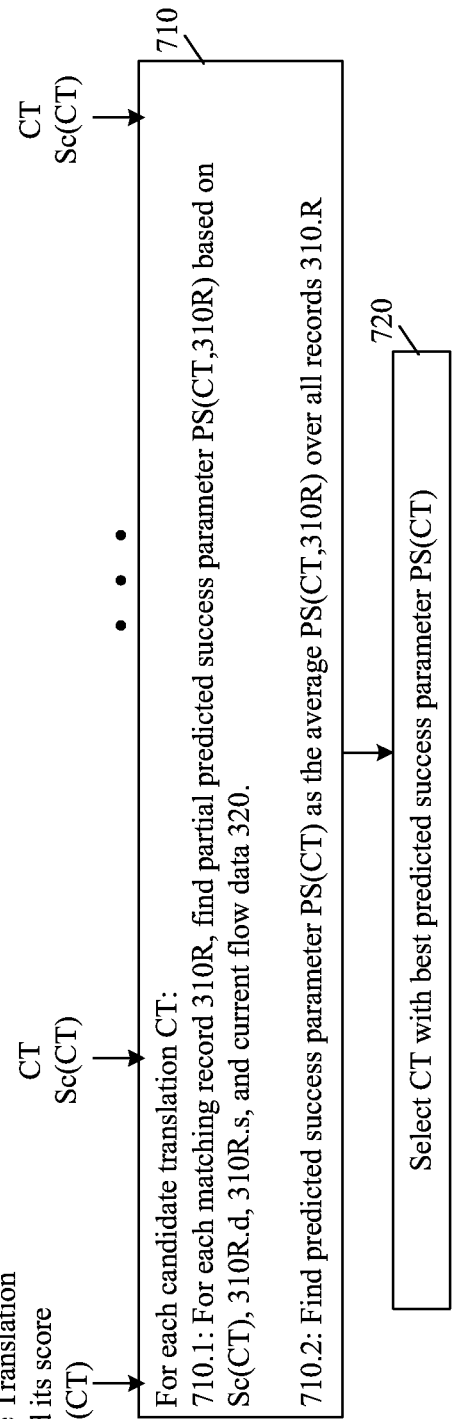

USE OF STATISTICAL FLOW DATA FOR MACHINE TRANSLATIONS BETWEEN DIFFERENT LANGUAGES

BACKGROUND OF THE INVENTION

The present invention relates to use of statistical data for machine translations in computer networks when translation is needed between different languages.

Translations are becoming increasingly important as the Internet and other computer networks cross international borders and provide access to a wide variety of documents written in different languages. Commercial, scientific, engineering, political, artistic, and other types of human interaction often require translation. Human translators cannot keep up with this demand, and machine translation is becoming prevalent. Machine translation (MT) is produced by a computer as it executes computer instructions. Naively speaking, an MT system should imitate the work of a human translator who understands the source language and expresses the same understanding in the target language. However, human understanding and human expression cannot be captured by computers: while both humans and computers can consult dictionaries and grammatical rules, humans can translate even without knowing grammar, and human ability to understand each other even without speaking enhances their translation abilities in ways unmatched by computers which do not understand anything but just follow instructions. On the other hand, computer speeds are unmatched by humans, and neither is the computer ability to store vast amounts of data which can be recalled systematically without a hint or cue. Consequently, machine translation has developed as a field with its own lexical and statistical techniques designed to meet the usual engineering concerns such as minimizing the use of computer resources (memory, processing power, network bandwidth, etc.) while providing adequate speed and low cost.

FIG. 1 illustrates a computer network with a server 110 that performs machine translations in response to requests received over a network 130 (e.g. the Internet) from computers 120. Server 110 can be a single computer or a distributed system including multiple computers interconnected by a variety of networks possibly including the network 130. A request from a computer 120 may be an explicit request to translate a document, or may be a request to perform some other task requiring translation, for example, to perform a search of documents in different languages. Thus, a user of computer 120 may submit a search query in one language, but the query must be matched against documents written in another language, so the search query has to be translated before the search can proceed.

Server 110 has access to computer databases 140 storing the documents to be searched. Machine translation engine 160 translates the queries if needed. Search engine 150 accepts the translated queries, searches the pertinent databases 140, and produces the search results, e.g. a list of database documents with a link (URL) for each document, possibly with a brief description of each document or a sample of the document's contents.

MT engine 160 uses its databases 170 to perform translations. Databases 170 contain language model information 170R which includes computer dictionaries and computer representations of grammar, and also contains statistical information 170S derived from known translations.

Importantly, the server can store information on search requests to help improve future translations. Such information is shown as click-through logs 180. For example, suppose that many users submit an English language query which we will denote as "qEn", and after obtaining the search results the users frequently select from the search results a given URL (Uniform Resource Locator), e.g. www.fedex.com, which is an English-language home page of a U.S. company. Suppose also that many other users, possibly Chinese-speakers, submit a Chinese language query qCn, obtain search results, and select the URL www.fedex.com/cn, which is the Chinese-language home page of the same company. Server 110 may conclude that the English language query qEn is an English translation of the Chinese language query qCn. See e.g. U.S. pre-grant patent publication no. 2010/0161642 (Chen et al.) published Jun. 24, 2010 for other uses of the click-through data to improve machine translations.

The click-through data 180 are processed by the server's data mining engine 190 to update the MT databases 170 with pertinent information. More particularly, data mining engine 190 finds correlations between the click-through data (e.g. between URLs such as www.fedex.com and www.fedex.com/cn, and data queries such as qEn and qCn) and updates the MT databases 170 with information needed to improve future translations, e.g. with an indication that qEn and qCn are translations of each other.

FIG. 2A is a flowchart of a process performed by server 110. At step 210, the server receives information on a user request from a computer 120. The request can be a search query or a request for a document from previously submitted search results. At step 220, the server logs the request in click-through database 180. At step 230, the server performs other processing as needed for the request.

FIG. 2B shows an example processing operation 230 performed when the user request is a search query. At step 234, the server checks whether the query needs translation. In particular, the server determines in what language the query is; this is done by the server looking up the words of the query in dictionaries stored in databases 170. The server then determines in what languages the search should be performed. If the search should be performed in a language other than the query language, the query is provided to MT engine 160, which translates the query at step 238.

The translated query, or the original query if no translation is needed, is provided to the search engine 150. The search engine performs the search at step 242, and provides the search results. At step 246, the server sends the search results back to the computer 120.

SUMMARY

This section summarizes some features of the present disclosure. Other features may be described in the subsequent sections. The invention is defined by the appended claims, which are incorporated into this section by reference.

In some embodiments, a machine translation system uses statistical information other than information 170S derived from known translations. One example of such information is the user's activity in the same computer session prior to submitting the query, e.g. information derived from the flow through one or more web sites before submitting the query. Therefore, the same query can be translated differently for different users or for the same user in different interactions with the server even if the MT database 170 is unchanged.

In a simplified example, suppose that a query contains a Russian word "list" (лист). This word may denote a leaf of a tree, or may denote a sheet (e.g. of paper or steel). The MT system must determine whether to translate the Russian word as "leaf" or "sheet". Suppose that the query is submitted by different Russian-speaking users: one user has just browsed through web pages related to gardening, while another user submitted the same query after browsing through engineering literature. For the first user, the MT system may output "leaf" as the translation, while for the second user may output "sheet".

Users' preferences are not always detectable by simple analysis, so in some embodiments, the server applies computer-based data-mining and machine-learning techniques to the click-through data to find what portion of a flow before the query is statistically related to success of a translation. Success can be measured by indicators derived from the user's actions after receiving the search results. One example is a click-through rate, defined as the number of documents that a user requested (clicked on) after receiving search results for a query translated in a particular way: if this number of documents is high, then the translation is assigned a high success score (the score can be defined as the click-through rate or in some other way). Such success scores are used by the MT system in subsequent translations.

Another possible success indicator is the amount of time that the user spent on reviewing the documents in the search results produced for the query translated in a particular way: more time corresponds to a greater success.

The success indicators are chosen based on desired results. For example, electronic commerce may use GMB (Gross Merchandize Bought by a user after receiving the search results), or the number of items bought, or the number of items about which the user requested more information, or some other key performance indicators used in commerce. In a system in which the server pushes advertisements to the user, a possible success indicator may relate to whether the user clicked on any advertisement, the number of advertisements clicked on, the user making a purchase based on the advertisement, the purchase amount measured in money or the number of items bought, etc. If the server allows users to bid on products, or place a watch on a product, or perform other actions of commercial value, the positive results can be used as success indicators.

As noted above, in some embodiments, the MT engine uses information on user flow to select a translation. Additionally or alternatively, information on user flow is used to arrange the search results (e.g. order the search results). Thus, in some embodiments, the search engine performs a search on each of multiple candidate translations (e.g. both "leaf" and "sheet" in the example above), and the search results are arranged based on user flow when they are provided to the user. Thus, the server first obtains search results for each of the translations, i.e. search results for "leaf" and separate search results for "sheet". The server then may combine these two sets of search results as follows: for the user interested in gardening (i.e. whose prior flow involves gardening documents), the server may first take two documents from the search results for "leaf", then one document is taken from the search results for "sheet", then the next two documents from the search results for "leaf", then one document from the search results for "sheet"; and so on. For the user interested in engineering, the server may give a similar preference to the search results for "sheet".

In some embodiments, when a user's query needs to be translated, the server performs the following operations:

The server obtains parameters of interest ("flow parameters of interest") in the user's flow leading to the query. The flow parameters of interest are those flow parameters which were correlated with success indicators as previously determined by the server through statistical analysis of click-through logs 180.

The server then searches the click-through logs for flows with the same or similar flow parameters, and selects from those flows the translation that fetched the highest success indication. The server uses this translation for the current user (i.e. the user who submitted the query).

In some embodiments, selection of possible translations or combining the search results takes into account random values, e.g. values generated by the server. Random values can be used to perform multivariate testing, e.g. statistical "AB testing", i.e. to statistically determine, from success indicators of different translations, which of the translations is more likely to be successful. In statistics, "AB testing" denotes testing for two hypotheses, A and B, e.g. testing of two possible translations as to which of the translations is more successful. Multivariate testing involves testing for any two or more hypotheses, e.g. as to which of two or more possible translations is more successful. Thus, for two possible translations "A" and "B" of a given query received from multiple users, a random value is generated for each user, and based on this random value, the user is given the translation "A" or "B", i.e. for some users the translation A is provided to the search engine, and for others the translation "B" is provided to the search engine. The resulting success indicators are analyzed to determine which translation is better. Then future users are given only the best translation. Alternatively, the analysis may show a correlation between a success indicator and some other flow parameter(s). Then a future user is given the best translation for the corresponding flow parameters for that flow.

Random values can be combined with other information (e.g. user flow information) to determine the best translations and/or arrange the results.

The invention is not limited to the features and advantages described above except as defined by the appended claims.

BRIEF DESCRIPTION OF THE DRAWINGS

FIG. 1 is a block diagram of a server in a computer network according to prior art.

FIGS. 2A, 2B are flowcharts of server operations according to prior art.

FIG. 6 illustrates a database record according to some implementations introduced by the present disclosure.

FIG. 7 is a flowchart of server operation according to some implementations introduced by the present disclosure.

DESCRIPTION OF SOME EMBODIMENTS

The embodiments described in this section illustrate but do not limit the invention. The invention is defined by the appended claims.

Figure 3:
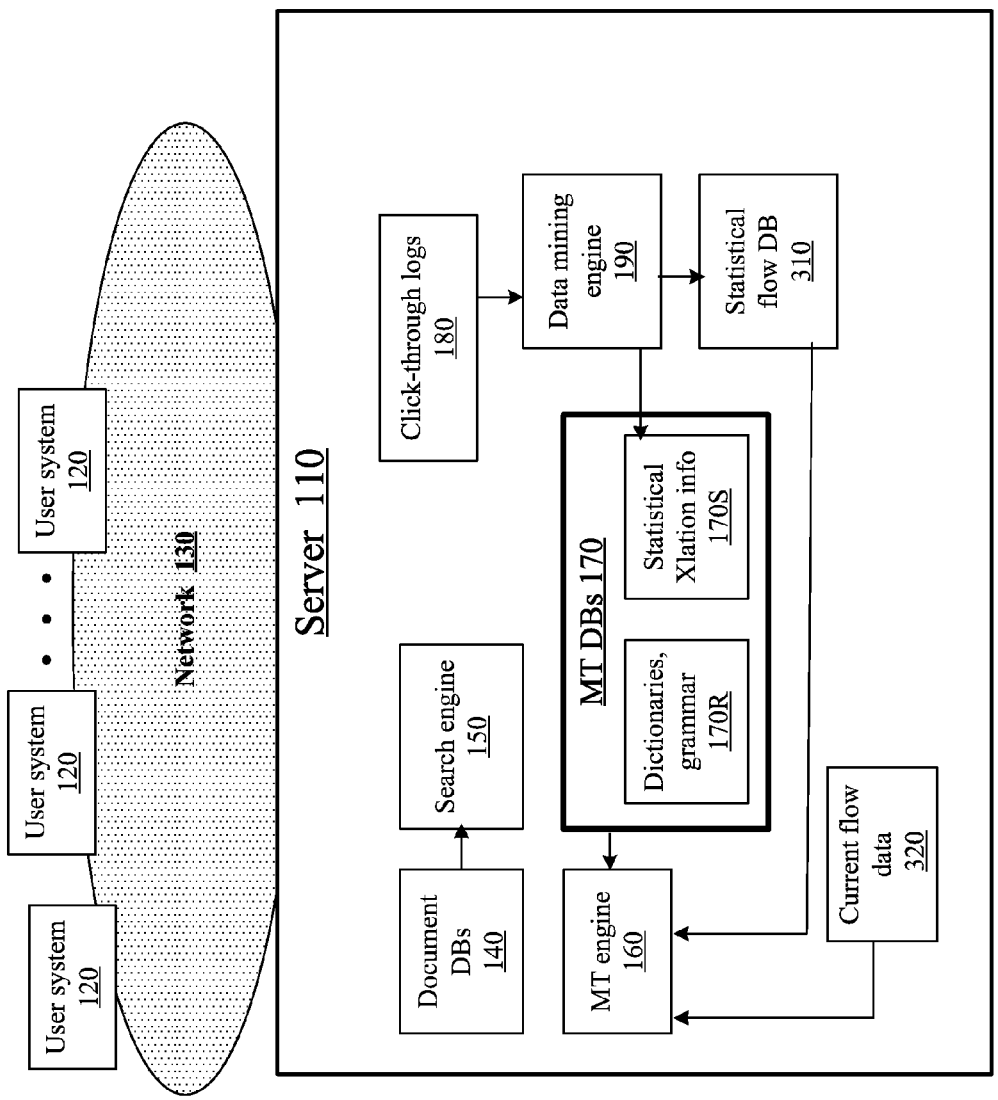
FIG. 3 is a block diagram of a server in a computer network according to some implementations introduced by the present disclosure.

Some embodiments will now be illustrated on the example of a system of FIG. 3 parts of which may or may not be as in FIG. 1, but server 110 incorporates novel aspects. Computers 120 and network 130 can be as in FIG. 1, or some other type. Search engine 150, databases 140, and MT databases 170 can also be as in FIG. 1 or some other type. Click-through logs 180 may be as in FIG. 1 or may include additional data.

Data mining engine 190 may perform the same operations as in FIG. 1, and may perform additional operations to generate statistical flow database 310. Statistical data 310 are obtained by data mining the click-through logs 180 for statistical information on the correlation between success indicators on query translations on the one hand and various aspects of user flow on the other hand. Suitable data mining techniques include Clustering, Classification, Regression, Time Series Analysis, Sequence Discovery, and are described, in many publications including, for example, references [1], [2], [3] listed in the Bibliography section below (before the claims); see also references listed in "Haym Hirsh's Publications: Text Retrieval, Text Classification, and Text Mining" available at http://www.cs.rutgers.edu/~hirsh/publications/text.html.

Machine translation engine 160 uses the statistical flow data 310 and current flow data 320 (the data on the user flow which leads to the query, i.e. the flow's portion before the query) in addition to MT databases 170. In some embodiments, current flow data 320 is obtained from click-through logs 180 (which is obtained by logging at steps such as 220 or 230 of FIG. 2A). Alternatively or in addition, current flow data 320 can be obtained from a browser cookie stored on the user's computer 120, or from the URL supplying the search query to the server, or possibly from other sources.

Figure 4:
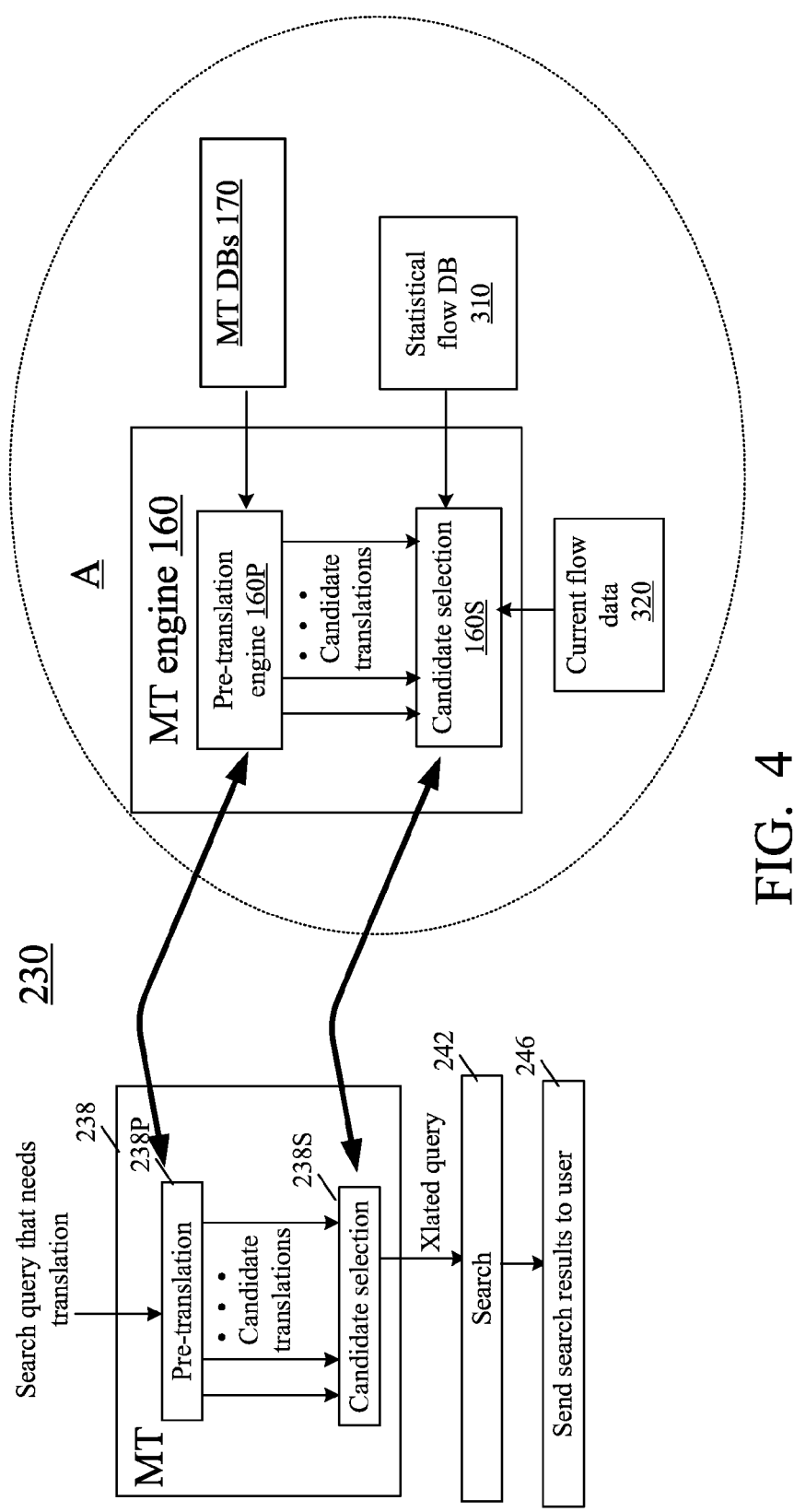
FIG. 4 includes a flowchart of server operation and a block diagram of a server according to some implementations introduced by the present disclosure.

FIG. 4 is an exemplary flowchart of query processing by server 110 in some embodiments. The server may operate according to the general scheme of FIG. 2A, but step 230 is different. In particular, step 230 may involve logging of more click-through data into log 180 than in FIG. 2A. Also, the machine translation is performed differently than in FIG. 2B, as illustrated in FIG. 4.

FIG. 4 shows only those steps that are needed to illustrate the novel machine translation. Some embodiments include additional steps, e.g. step 234 of FIG. 2B (determining if the query needs translation, and submitting the untranslated query to search engine 150 if no translation is needed).

The translation if needed is performed at step 238 by MT engine 160, whose architecture is shown in insert A in FIG. 4. MT engine 160 includes a pre-translation engine 160P and candidate translation selection module 160S. Pre-translation engine 160P can generate multiple candidate translations of the query (at sub-step 238P of step 238). For example, engine 160P may provide both "leaf" and "sheet" for Russian word "list" as described above. Candidate selection module 160S selects one of the translations (sub-step 238S). The selected translation is then provided to search engine 150, which performs the search at step 242. The search results are sent to the user at step 246. Steps 242 and 246 can be as in FIG. 2B.

Returning to MT step 238, pre-translation 238P may or may not be as in prior MT systems; see e.g. U.S. Pre-Grant Patent Publication no. 2010/0179803 (Sawaf et al.) published Jul. 15, 2010, incorporated herein by reference. As described therein, a statistical MT engine may initially provide a number of candidate translations based on MT databases 170, then select the highest-probability translation. In some embodiments of the present invention, MT engine 160 (FIG. 4) has a pre-translation engine 160P which determines candidate translations, possibly as in the aforementioned Sawaf reference or in some other way (possibly in novel ways discussed below). However, the candidate selection is different because the candidate selection module 160S takes into account statistical flow data 310 and current flow data 320, matching the current flow data 320 against statistical relationships between prior flows and translation success indicators as provided by data mining engine 190. The candidate selection module 160S of FIG. 4 can be a machine learning engine that predicts the best candidate translation based on prior flows to maximize the translation success indicators.

Exemplary implementations of the above schemes will now be described. Table 1 below illustrates an exemplary flow and the corresponding click-through data 180 for an exemplary user. In this example, click-through data include domains associated with each document (possibly HTML page) requested by the user (i.e. by the computer 120) in a single session of interaction with the server 110. ("HTML" stands for Hypertext Mark-up Language often used in Wide World Web (WWW); however, the invention is not limited to HTML, WWW, or the Internet: the invention can be used with other types of networks or network protocols). A "domain" is any information that may potentially help in selecting a proper translation. For example, a domain can be a topic to which the document pertains, such as "gardening", "engineering", "mechanical engineering", "financial services", "travel", etc. In commerce, a domain may describe a category of products, such as "shoes", "men's shoes", "closing", "luggage", "bags", "mobile phones", etc. A single document or HTML page may be associated with multiple domains.

In table 1, server actions are shown as A1, A2, etc. The corresponding click-through data logged by the server are shown as L1, L2, etc.

TABLE 1

An example of one flow and of associated click-through data

| Server action | Click-through data logged for server action |
|---|---|
| A1. Receive, from the user, a URL indicating a home page. Assign ID to the flow (e.g. based on user ID if known, and/or on ID of computer 120, and/or on IP (Internet Protocol) address, etc.) Send home page to user | L1. (a) Flow ID; (b) Home page description (e.g. title, components or their description, elements of each component or description of elements; the elements may include text, video, data entry fields (e.g. for search queries), etc.; (c) Domains of home page (maybe just a generic domain, i.e. including all topics); Key words or other information on home page; (d) Time when home page was sent to user |

TABLE 1-continued

An example of one flow and of associated click-through data

| Server action | Click-through data logged for server action |
|---|---|
| A2. Receive URL from user (e.g. if user clicked on a link in home page); Send corresponding page to user (could be HTML page, PDF document, or other type of information) | L2. Information on requested page (HTML page, or PDF document, etc.), possibly same type information as in L1(a) through (d) |
| A3. Other actions similar to A2 | L3. Other click-through data similar to L2 |
| A4. Receive search query from user; Obtain search results, send them to user (as at step 246 in FIG. 4) | L4. Query (in source language), whether translation is needed, translation or translations used to generate search results (translations can be logged when provided to search engine 150), information on search results page sent to user at step 246 (possibly the entire search results page, time when sent). Initialize click-through rate to 0 for this query (clicked-through rate can be part of click-through data 180) |
| A5. Receive URL from user; Determine that the URL corresponds to one of the documents in search results page sent at A4 (this information may be specified in the URL, e.g. as a URL parameter, or using a cookie for example); Send document to user if the document is at the server; if the document is at another web site, then either (i) obtain the document and send it to the user, or (ii) redirect the user to the other web site | L5. Update click-through rate for the search results to indicate that a document was requested from the search results in L4. Initialize time spent on reviewing the document to 0. Record document information (as in L1). Record time the document was sent to user |
| A6. Like A5: (URL for another document from search results in A4). | L6. Update click-through rate for the search results. Measure and record the time spent on reviewing the document provided in A5. Record information on document provided in A6 (like in L1), and time the document was sent to user. |
| A7. Receive URL indicating that the user is making a purchase or clicking on advertisement. Provide corresponding HTML page or document to user (e.g. to obtain credit card information for charging the purchase, or to direct the user to the advertiser's web site). | L7. Measure and record time spent on reviewing the document provided in A6. Record information regarding purchase or advertisement (including purchase amount, etc.) |

Figure 5:
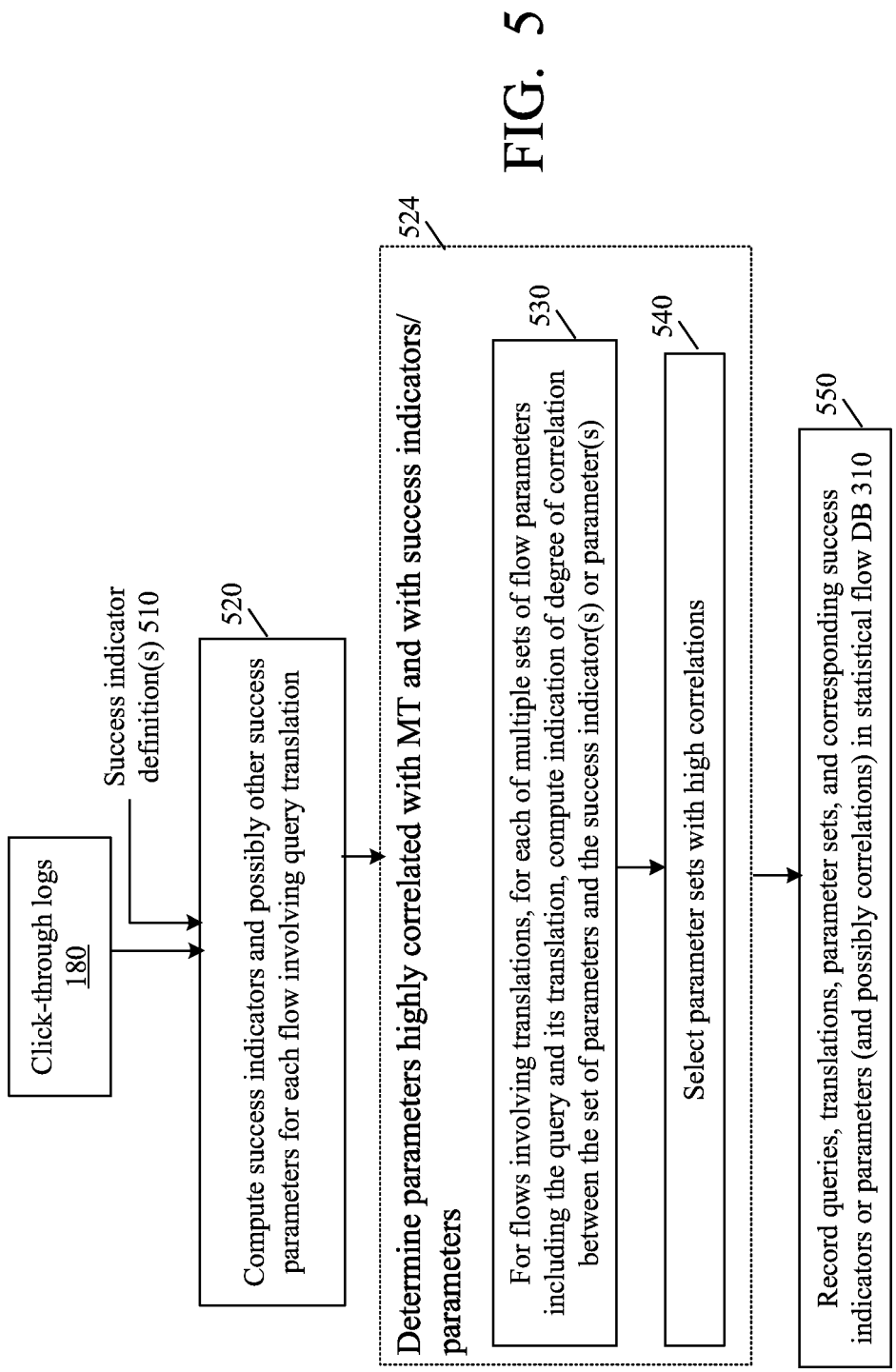
FIG. 5 is a flowchart of server operation according to some implementations introduced by the present disclosure.

Once in a while, data mining engine 190 analyzes the click-through data 180 and creates or updates statistical flow DB 310. FIG. 5 illustrates exemplary operations performed by data mining 190 in some embodiments. In addition to click-through logs 180, DM 190 receives definitions 510 of success indicators of interest (exemplary success indicators are click-through rates, gross merchandize bought, and others described above). Then DM 190 analyzes the DB 310 and the success indicators to determine pertinent information for DB 310. Exemplary algorithms for this analysis include correlation analysis, clustering, classification and time series analysis, described in [4] through [12] (see the Bibliography section below). Other algorithms are also possible.

In the example of FIG. 5, at step 520, DM 190 computes success indicators for the flows involving at least one machine translation of a query. DM 190 may also compute success parameters based on the success indicators; for example, if there are multiple success indicators, then a success parameter can be a function (e.g. sum) or these success indicators and can be used to simplify further processing.

At step 524, DM 190 determines which flow parameters are "significant" for the success of machine translation, i.e. which flow parameters are highly correlated with the particular machine translations and the success indicators (and/ or success parameters). Various algorithms can be used as mentioned above. In the example of FIG. 5, step 524 involves steps 530 and 540. At step 530, DM 190 computes correlations between queries, translations, success indicators/parameters, and various types of click-through data to determine, at step 540, which translations and other flow parameters of the click-through data are highly correlated with the success indicators/parameters. Exemplary flow parameters include domains of documents requested by a user in the flow before the translation, URLs specified in the flow before the translation, flow parameters (e.g. domains) involved in prior translations before a given translation in the same flow, the time intervals between successive user requests sent to the server before the translation, the background colors or other visual properties of preceding pages shown to the user, etc. A correlation can be computed between a flow parameter and a success indicator/parameter, to identify flow parameters that are not highly correlated with machine translations. More generally, a correlation can be computed between a set of one or more success indicators/parameters and a set of one or more flow parameters.

At step 540, DM 190 selects the best flow parameter sets based on the correlations. The "best" sets can be defined in different ways. For example, a correlation can be represented as a Pearson correlation coefficient which is a number between 0 and 1 inclusive. Step 540 may select all the flow parameter sets with correlations equal to or greater than a predefined number (e.g. equal to or greater than 0.5), or up to a maximum number of flow parameter sets with the highest correlations (e.g. 100 flow parameter sets with the highest correlations), or select the best flow parameter sets in some other way taking the correlations into account. In some embodiments, the correlations are weighted with some weights based on other desired properties; in one example, a flow parameter set with a large number of flow parameters is given a lower weight since such a flow parameter set may need more computations at the candidate selection step 238S.

At step 550, DM 190 creates or updates statistical flow DB 310 to allow prediction of success indicator(s)/parameter(s) of interest for a given machine translation of a given query based on the flow parameters selected at step 524 (i.e. at step 540). DB 310 is populated with data allowing such prediction. For example, the selected flow parameter sets can be recorded in flow DB 310, possibly together with the corresponding success indicators/parameter(s) and possibly together with correlations, or with indications on whether the correlation is positive or negative (positive correlation may indicate, for example, that an increasing number of occurrences of a particular domain is associated with an increase of a particular success indicator or parameter for a given translation of a given query; a negative correlation may indicate the opposite relationship, i.e. that an increasing number of occurrences of the domain occurrences is associated with decrease of the success indicator/parameter for the translation of the query).

DM 190 may also perform other operations unrelated to the analysis of FIG. 5, e.g. operations needed to update the statistical MT database 170S; see the aforementioned Sawaf reference.

FIG. 6 illustrates an exemplary record 310R created at step 550 in statistical flow DB 310. In this example, DM 190 determined at steps 530, 540 that significant flow parameters include the domains seen in the flow before the query was received and the number of times (the frequency) that each domains was seen in the flow. Thus, in the example of Table 1, for the query translation recorded at L4, and for given success indicators 510 (e.g. subsequent click-through rates as recorded at L5 and L6, or the time spent on viewing the documents from the search results as determined from L6 and L7, or the gross merchandize bought as determined from L7), the success indicators are correlated with the domains recorded at L1 through L3 and their frequencies (for example, if a domain was seen at L1 and L3 but not L2, the domain frequency is 2). DM 190 creates one or more records 310R each of which includes the following fields:

a query 310R.q;
its translation or translations 310R.t provided to the search engine 150 (at step 242; as explained below, multiple translations can be selected and provided to the search engine);
domains 310R.d seen in the flow before the translation, and the frequency of each such domain; and
the corresponding success indicator(s) 310R.s.

In some embodiments, a separate record 310R is created for each triple of fields 310R.q, 310R.t, 310R.d, i.e. for each query, translation, and domains/frequencies combination; the same triple may have occurred in multiple flows, and each success indicator 310R.s is the average over all such flows.

In other embodiments, a separate record 310R is created for each duplet of fields 310R.q, 310R.t, i.e. for each pair of a query and translation(s); for all the flows with a duplet, the domain field 310R.d includes all the domains seen in all such flows prior to the query; each domain's frequency is the domain's average frequency over all such flows; each success indicator is also the average over all such flows. Other options are possible in creating DB 310; the best option may be different for different applications, and can be experimentally determined.

The information in flow DB 310 may be organized in computer storage accessible to server 110 in any desired way.

FIG. 7 illustrates an exemplary implementation of step 238S (FIG. 4) that selects a translation from the candidates provided by pre-selection 238P. In this embodiment, pre-selection 238P generates candidate translations CT together with a score Sc(CT) for each candidate translation; the score Sc(CT) represents a statistically derived probability or some other probabilistically derived numerical indication that the translation candidate CT is the correct translation. The candidate translations were obtained from MT databases 170 without taking into account the current flow data 320 (FIG. 4).

At step 710, for each candidate translation CT, the server examines the matching records 310R, where "matching" means that a record 310R:

(a) has the same query 310R.q as the current query received by MT engine 160, and
(b) has at least one translation 310R.t which is the same as the candidate translation CT.

In some embodiments, the conditions (a) and (b) are relaxed; for example, condition (a) may require that the two queries are similar (e.g. the words of one query are synonyms of the words of the other query, and/or the queries differ only by word order and/or only morphologically and/or only by prepositions or other particles and/or in some other way considered minor).

For each matching record 310R, the server 110 performs steps 710.1 and 710.2. At step 710.1, the server predicts a success parameter PS(CT) which is a measure of success for the candidate translation CT. The predicted success parameter PS(CT) is evaluated from:

the candidate's score Sc(CT);
the matching record's domains and frequencies 310R.d and success indicators 310R.s; and
the current flow data 320, and more particularly, in this example, the current flow's domains and their frequencies (such as recorded at L1 through L7 in Table 1 above; in particular, if the translation is performed at A4, then the pertinent domains and frequencies are those recorded at L1 through L3).

For example, in some embodiments, the predicted success parameter PS(CT) is obtained from partial predicted success parameters PS(CT, 310R) based on the record 310R. The partial predicted success parameter PS(CT, 310R) is evaluated for each record 310R as follows:

1. Find the intersection between the record's domains 310R.d and the domains seen in current flow 320 before receipt of the query (i.e. find the domains that occur in both).

2. For each domain in the intersection, determine the degree of matching of the domain's frequencies. This can be done, for example, by computing a function Fd(f310, f320) where f310 is the domain's frequency in 310R.d, and f320 is the domain's frequency in current flow 320. The function Fd is chosen so that it increases inversely relative to the absolute difference absd between the frequencies, i.e. relative to $$absd = |f310 - f320|,$$

or relative to the relative difference reld between the frequencies, i.e.

$$reld=|f310-f320|/\max(f310,f320)$$

or relative to some other measure of the difference between the frequencies.

For example, in one embodiment, Fd(f310,f320)=1/absd, and is defined as some high value if absd=0. In another embodiment, Fd(f310,f320)=1/reld, and is defined as some high value if reld=0.

3. Add all the Fd values over all the domains in the intersection. Let us denote this sum as SFd (if the intersection consists of a single domain, then SFd is the Fd value for this domain). The function SFd is a measure of how well the domains 310R.d of record 310R match the domains of the current flow 320.

4. Multiply SFd by success indicator 310R.s, and add the score Sc(CT). This value is the partial predicted success parameter PS(CT,310R) for the candidate translation CT based on record 310R.

At step 710.2, the server determines the average of all the partial predicted success parameter PS(CT,310R) values for all the matching records 310R for the candidate CT. This is the predicted success parameter PS(CT) for the candidate CT.

The predicted success parameter PS(CT) can be computed as some other function of the frequencies f310, f320, 310R.s, Sc(CT), and possibly the number of matching records 310R. In some embodiments, PS(CT) increases in 310R.s, Sc(CT), and at least one of absd or reld, but this is not necessary.

At step 720, server 110 selects the candidate translation CT with the maximum predicted success parameter PS(CT) as determined at step 710. This translation is supplied to search engine 150.

The above algorithms are exemplary and do not limit the invention. For example, filed 310R.d may include one or more of candidate translations CT and corresponding scores Sc(CT) if DM 190 finds such translations and scores to be significant, i.e. highly correlated with the query 310R.q, translation 310R.t, and success indicators 310R.s. Thus, the flow parameters determined at step 524 as significant may include parameters related to the flow portion after receipt of the query.

In another example, the candidate translation is selected at step 238S using an artificial neural network approach, i.e. using a function determined via an argument optimization process. Let us denote this function as NNF. The goal of DM 190 is to find the function NNF which may, for example, accept the significant flow parameters of current data flow 320 together with the query and its candidate translations CT, and to output some information useful in selecting the best translation CT to supply to the search engine. For example, the best translation CT can be the one having the best predicted success indicator(s), e.g. the best predicted success parameter PS(CT) described above or defined in some other suitable way related to success. Or NNF may output the success indicator(s) or other parameters such as Sc(CT) of the best candidate translation, or provide some other information useful in selecting the best candidate translation. The function NNF is initially unknown but has a predefined type, e.g. it may be a linear function with unknown coefficients, or a quadratic or some other kind of function with some unknown information. NNF is determined by DM 190 through argument optimization.

Consider for example the following model: the function NNF is of a predefined type (linear or otherwise) as described above, and its output is completely defined by the significant flow parameters and the scores Sc(CT), and more particularly the NNF output is the index In(CT) of the best candidate translation CT assuming that the translations are ordered by their scores Sc(CT), where the order is predefined as increasing or decreasing (if different translations have the same score Sc(CT), such translations can be ordered in some other way, e.g. alphabetically or randomly). Such a function NNF may or may not exist, and NNF is chosen as the best fit among all the functions of the predefined type, where "best fit" is defined as minimizing some "loss" value, e.g. as minimizing the average square of the difference between the NNF output and the best index In(CT), or as minimizing the average absolute value of the difference, or in some other way.

Thus, in some embodiments, for each action involving a query translation (e.g. A4 in Table 1), server 110 includes the following data into click-through DB 180 (e.g. as data L4): the query, the candidate translations CT and their scores Sc(CT), and the index In(S-CT) of the selected candidate translation provided to search engine 150, where the index is computed when the translations are ordered as described above.

When DM 190 processes click-through DB 180, DM 190 determines the best-fit NNF by an optimization process involving the following operations:

Operation DM1:
Determine the success indicators/parameters and significant flow parameters from click-through logs 310 and success indicator definition(s) 510; see FIG. 5. This can be done for example as in steps 520, 530, 540 described above.

Operation DM2:
For each query that was translated per DB 180 (i.e. for each data record such as L4, and thus for each action such as A4), DM 190 determines the values of the significant flow parameters in the flow in which the query was received; DM 190 thus obtains an argument value of the NNF function; the argument value is the combination of the values of these significant flow parameters and the scores Sc(CT). DM 190 also determines the value of the success parameter.

Operation DM3:
DB 180 may include different translations of the same query that were provided in different flows or at different stages in the same flow. Different translations may or may not have the same argument value, i.e. the same combination of the significant flow parameters and the Sc(CT) scores. For each query that was translated, DM 190 determines all the argument values and selects the best argument value. The best argument value is selected based on the success indicators/parameters, for example, based on a success parameter that somehow summarizes the success indicators (e.g. as the sum of the success indicators). For example, the "best" argument value may be defined as the argument value which corresponds to the maximum success parameter, or as the argument value that corresponds to the maximum average success parameter, or in some other way.

If multiple argument values satisfy the "best" definition, then a single "best" argument value is chosen in a suitable way. One way is to choose the argument value that has occurred most frequently for this query or for multiple queries, but of course this criterion can also be satisfied by multiple argument values. Random selection of a single argument values among the best is also possible.

Operation DM4:
The best argument value corresponds to a particular translation or translations at a state or states such as A4. If there are more than one such states, one such state is chosen (e.g. randomly or in some other way). The corresponding translation is referred to as the "best translation" below, and the corresponding action (e.g. A4) is referred to as the "best action".

Operation DM5:

For the best translation and the best action, DM 190 reads, from click-through DB 180, the index In(S-CT) of the selected candidate translation provided to search engine 150. Let us denote this value In(S-CT) as the value In(Q,BA,CT), where Q is the query and BA is the best argument value (chosen in DM3).

Operation DM6:

For each argument value BA which is the best argument value for at least one query Q, DM 190 determines In(CT) as the average of all In(Q,BA,CT) over all the queries Q with the best argument value BA.

Operation DM7:

The function NNF is then chosen to provide the best fit for its desired values In(CT), e.g. to minimize some predicted (estimated) loss measured over all the combinations. As noted above, the loss can be defined as the average square of the difference between the NNF output and the best index In(CT), or the average absolute value of the difference, where the average is taken over all the arguments BA which are the best arguments for at least some queries. The loss can also be defined in some other way. Such best-fitting algorithms are well known; see e.g. [13] and [14] in Bibliography below.

In some embodiments, the function NNF is a composition of multiple functions (considered as different stages) as known from the neural networks theory, and each of the multiple functions can be determined by DM 190 by a "best fit" process (optimization process) which can be defined differently for different stages.

In some embodiments, a separate function NNF is computed for different flows. For example, DM 190 may determine that in order to provide low loss, the NNF should be different for users from one location than for users from another location (e.g. Germany versus Canada), or NNF should be different for queries containing a given word or set of words than for other queries. Such determinations can be made by known techniques, e.g. by computing the minimal loss separately for different sets of flows.

When DM 190 finds the NNF(s), it stores in statistical flow DB 310 the NNF definition(s), e.g. the NNF type (e.g. linear or other), a definition of the arguments (e.g. which flow parameters are part of the argument, whether any Sc(CT) are part of the argument, etc.), the coefficients or other information defining the NNF among the functions of that type, and other pertinent information. If multiple NNF are used, the information in DB 310 defines which NNF is applicable given a particular flow.

At step 238S, server 110 obtains the definition of the pertinent function NNF from statistical flow DB 310, obtains the pertinent argument value (e.g. as the combination of significant flow parameters and the scores Sc(CT) from current flow 320 and the output of step 238P), and computes the NNF value on these arguments. The server then uses the NNF value to select the candidate translation.

Other artificial neural network models can also be used.

Figure 8:
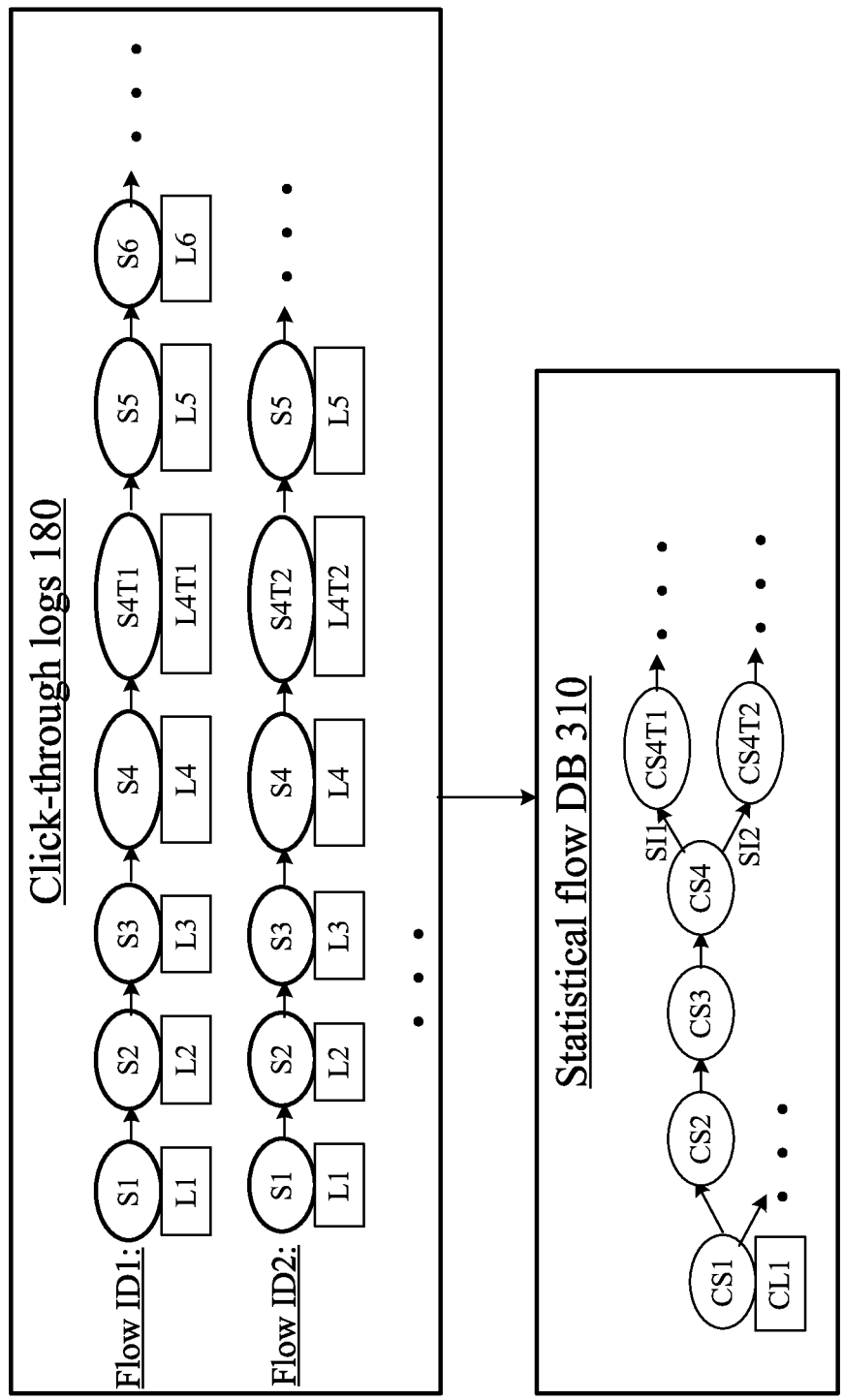
FIG. 8 is a flowchart of data flow in server operation according to some implementations introduced by the present disclosure.

Other data mining techniques can also be used. FIG. 8 illustrates a technique similar to Hidden Markov Model (HMM). In particular, FIG. 8 illustrates operation of DM 190 in creating or updating the statistical flow DB 310 from click-through DB 180. In this embodiment, each flow can be thought of as a finite state automaton (FSA). Click-through DB 180 keeps all these FSAs and their associated data (such as L1, L2, etc. in Table 1). FIG. 8 illustrates two flows: with a flow ID of ID1 and a flow ID of ID2. Each state S1, S2, etc. corresponds to an action such as A1, A2, etc. in Table 1. The corresponding click-through data are shown as L1, L2, etc. The states S and click through data L for flow ID1 may be different than for flow ID2. In each flow, additional states can be defined, e.g. as sub-states. For example, supposing that the flow ID1 is the flow of Table 1 with a machine translation in the row A4/L4, two states can be created in DB 180: state S4 represents receipt of the query, and state S4T1 represents the machine translation and its subsequent processing up to sending the search results to the user. Each of these states S4, S4T1 can be associated with all or some of data L4; for example, the state S4 may store the query but not its machine translation, and S4T1 may store the query and the machine translation. Such representation of DB 180 can also be used with other data-mining techniques, e.g. those described above in connection with FIG. 5 or artificial neural networks.

DM 190 optimizes the FSA defined in DB 180 to create a simpler FSA which it then stores in DB 310. The simpler FSA's states are shown as CS1, CS2, etc. in FIG. 8; their associated data are shown as CL1 for state CS1, and are not shown for other states for simplicity. We will use the term "S-state" for a state in DB 180, and "CS-state" for a state in DB 310. We will use the term "L-data" for the click-through data of DB 180 (e.g. data L1, L2, etc.) and "CL-data" for the data such as CL1 in DB 310.

To define the simpler FSA, DM 190 first finds the significant flow parameters, for example as in steps 520, 530, 540 of FIG. 5. Then, if different S-states in different flows that have the same significant flow parameters as indicated by their L-data, such S-states can be clustered, i.e. merged into a single CS-state. In some embodiments, the S-states in the same flow with the same significant flow parameters are also clustered. When different states are clustered, the common values of their L-data are also clustered into the corresponding CL-data; for example, the CL-data may include just the significant flow parameters.

For example, suppose that for flows ID1 and ID2, their states S1 differ only in the user locations: ID1 corresponds to Germany and ID2 corresponds to Holland. Suppose further that it is determined at steps 520, 530, 540 that the location is insignificant, or at least the Germany-Holland difference is insignificant. Then the states S1 of the two flows can be clustered into a single state CS1. State CS1 is associated with data CL1 ("CL-data") which includes the values of the significant parameters.

If an S-state was not clustered with any other state, the corresponding CS-state may be created, with the CL-data including the values of the S-state's significant flow parameters.

In the example of FIG. 8, suppose that the states S1 through S4 of flow ID1 have been clustered with the respective states S1 through S4 of flow ID2 into the respective states CS1, . . . , CS4. In particular, for state CS4, the flows ID1 and ID2 got the same query at their respective states S4, but the translations were different. (The translations may be different because for example MT DB 170 may be different at the time of S4 of ID1 than at the time S4 of ID2, e.g. the statistical DB 170S may be different, or because random selection was used to select the candidate translation, or for other reasons.) Therefore, there are two possible paths from state CS4: one path to a state CS4T1 for the translation obtained in ID1, and the other path to a state CS4T2 for the translation obtained in ID2. DB 310 associates each state CS4T1, CS4T2 with the respective translation. The corresponding CL-data include the query translation and possibly other information, e.g. the candidate translations, the Sc(CT) scores, and the index In(CT) of the selected candidate translation.

For each of the two possible paths from CS4, DM 190 computes the predicted success indicator(s) or other success parameters for each S-state involving a translation. These parameters are shown as SI1 for the path to CS4T1, and SI2 for the path to CS4T2. For each CS-state clustered from multiple S-states involving translations, the predicted success parameter can be the average over such multiple S-states.

In some embodiments, DM 190 records in DB 310 only the paths with the highest predicted success parameters. For example, if SI1 is greater than SI2, then only the path to CS4T1 is recorded in such embodiments; if SI1 equals SI2, then both paths may be recorded, or an arbitrarily chosen one of the two paths is recorded. In other embodiments, each path is recorded regardless of the success parameter values.

At step 238S, the current flow 320 is matched with DB 310. For example, suppose the current flow 320 goes through the states CS1, CS2, CS3, CS4. Then step 238S may select the candidate translation as in CS4T1 or CS4T2 with the highest predicted success parameter (SI1 or SI2) stored in DB 310.

Alternatively, each path may be associated with the index In(CT) of the candidate translation CT when the candidate translations are ordered by their scores Sc(CT) or in some other manner, and DB 310 may record an average index, and step 238S may select the candidate translation having this index. Other selection schemes are possible.

If the current flow 320 does not match any flow of DB 310, then a number of options are possible. In some embodiments, server 110 attempts to find a close flow in DB 310. A flow such as CS1 through CS4 is a close flow if the states CS1 through CS4 differ from the current flow's states only in flow parameters which may be significant but have a relatively low correlation with the success indicators (e.g. the correlations are lower than a selected threshold). Also, the flow may be close if it has additional CS-states which may not be very highly correlated with the success indicators, etc. If no close flow is found, the candidate translation can be randomly chosen at step 238S, or can be chosen as in prior art, e.g. by the highest score Sc(CT). The current flow 320 is added to click-through DB 180, and is taken into account the next time when DM 190 updates DB 310.

Some embodiments do not look for a close flow but always use random selection or the Sc(CT) scores or some other non-random method to select a candidate translation for search engine 150.

Figure 9:
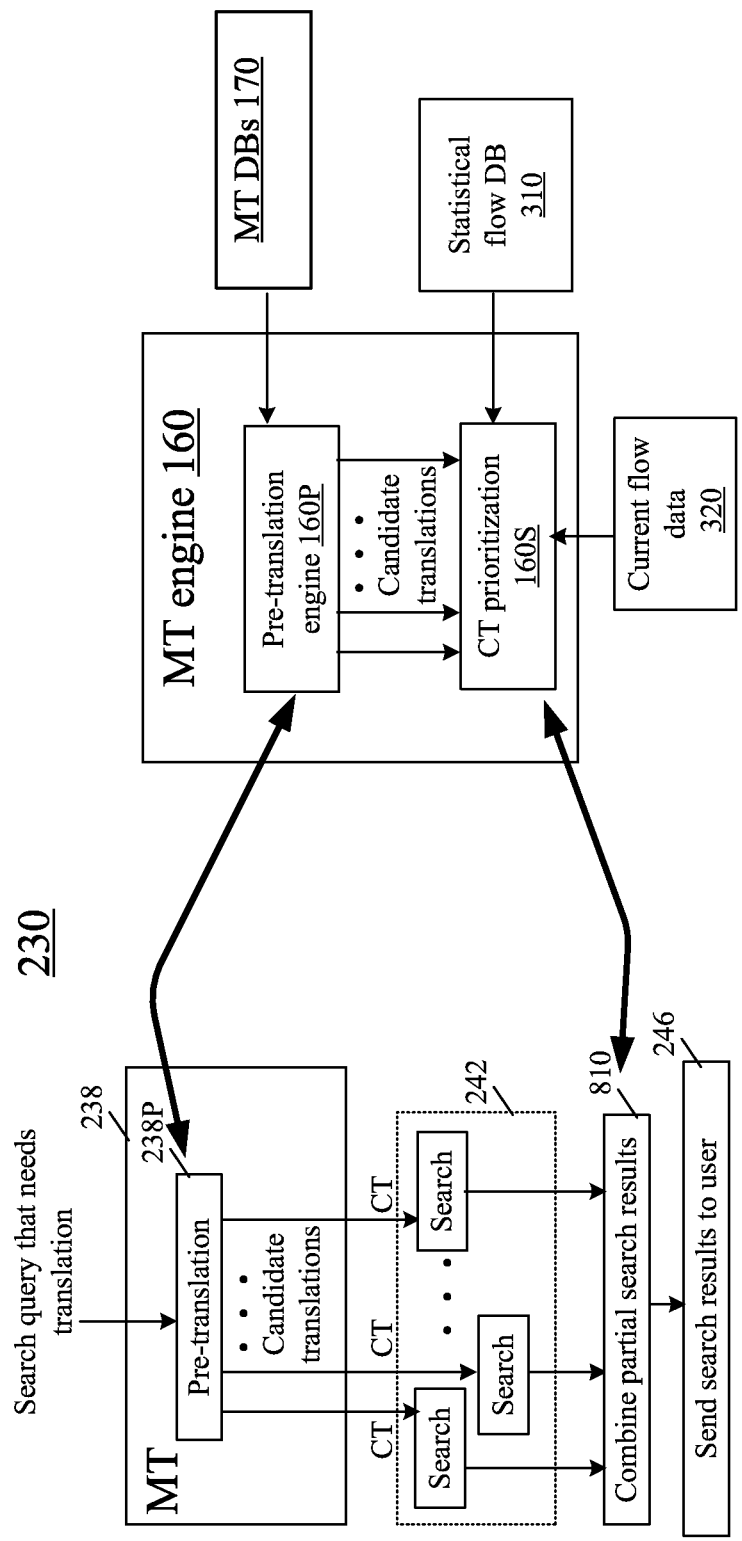
FIG. 9 includes a flowchart of server operation and a block diagram of a server according to some implementations introduced by the present disclosure.

As noted above, in some embodiments, rather than selecting a single translation for search engine 150, the search is performed for each candidate translation to produce "partial" search results, i.e. the search results for the candidate translation; then the flow data 320 are used to determine how the partial search results should be arranged for being sent to the user. FIG. 9 illustrates some embodiments of this scheme. Here MT engine 160 may include the same pre-translation engine 160P as in FIG. 4. The MT engine may also include CT prioritization module 160S which prioritizes the candidate translations to determine which of the partial search results should be given higher priority when the search results are later combined. The candidate translations generated by module 238P are provided to search engine 150, which performs a search for each candidate translation at step 242 to generate the partial search results for each translation. The partial search results are then combined (at step 810) and sent to the user at step 246. The partial search results are combined based on the output of CT prioritization 160S, which uses information on current flow data 320 and statistical flow data 310.

Figure 10:
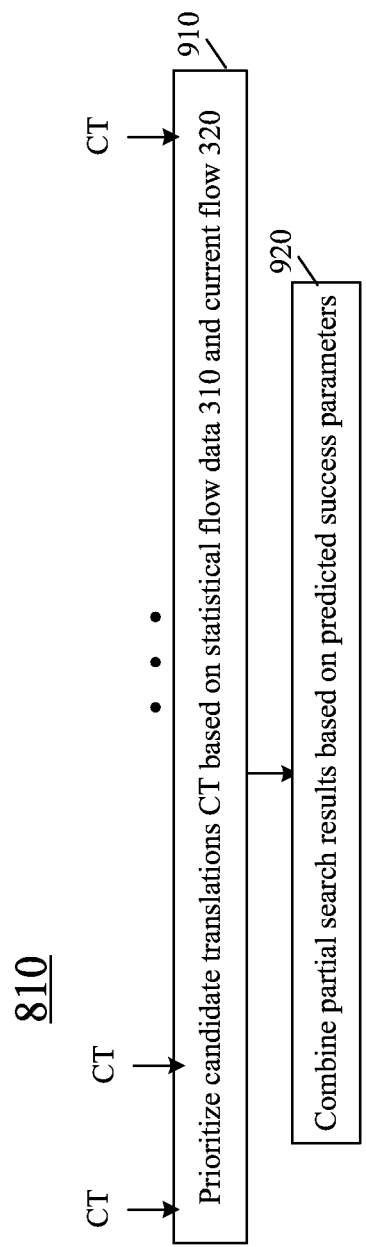
FIG. 10 is a flowchart of server operation according to some implementations introduced by the present disclosure.

For example, in some embodiments, step 810 is performed as in FIG. 10. In this embodiment, at step 910, CT prioritization module 160S prioritizes the candidate translations based on a predicted success of the translations. For example, in some embodiments, step 910 is identical to step 710 of FIG. 7: CT prioritization module 160S receives candidate translations CT and their scores Sc(CT) from pre-translation 160P and generates a predicted success parameter PS(CT) for each candidate translation CT.

At step 920, server 110 arranges the partial search results based on prioritization performed at step 910, to obtain combined search results to be sent to the user. For example, in some embodiments, the documents from partial search results are combined in proportion to the priorities provided by CT prioritization PS(CT). Thus, suppose for instance that there are three candidate translations CT1, CT2, CT3 with priorities are 3, 2, and 1 respectively (e.g. as defined by the PS(CT) success parameters or in some other way). Let us denote the corresponding partial search results as PSR1, PSR2, PSR3. Then at step 920, the server generates the search results so that the search results start with the first 3 documents of PSR1, then include the first 2 documents of PSR2, and then the first document from PSR1. Then again the server takes the next 3 documents from PSR1, the next 2 documents from PSR2, and the next document from PSR1 for the search results; and so on.

Figure 11:
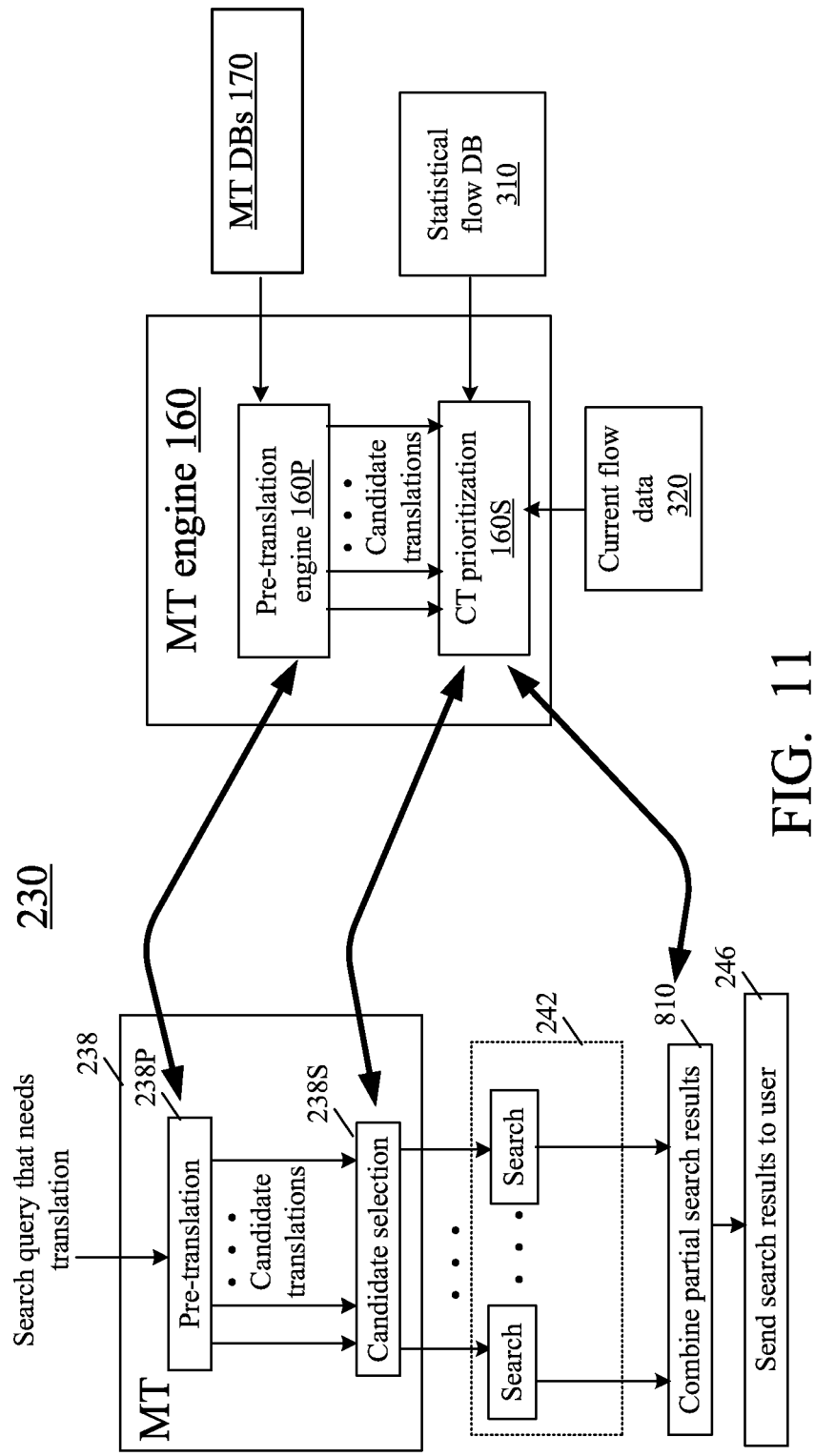
FIG. 11 includes a flowchart of server operation and a block diagram of a server according to some implementations introduced by the present disclosure.

As shown in FIG. 11, the methods of FIGS. 4 and 10 can be combined. First of all, at step 238S of FIG. 11, the MT engine 160 may select more than one but less than all candidate translations for the search. For example, MT engine 160 may select a predefined number of candidate translations with top priorities as defined by CT prioritization 160S (which may be as in FIG. 10), say the top 10 candidate translations. Or MT engine 160 may select the candidate translations whose priorities are above some threshold. Other criteria can also be used. These candidate translations are provide to search engine 150.

At step 810, the partial search results are combined as in FIG. 10.

Figure 12:
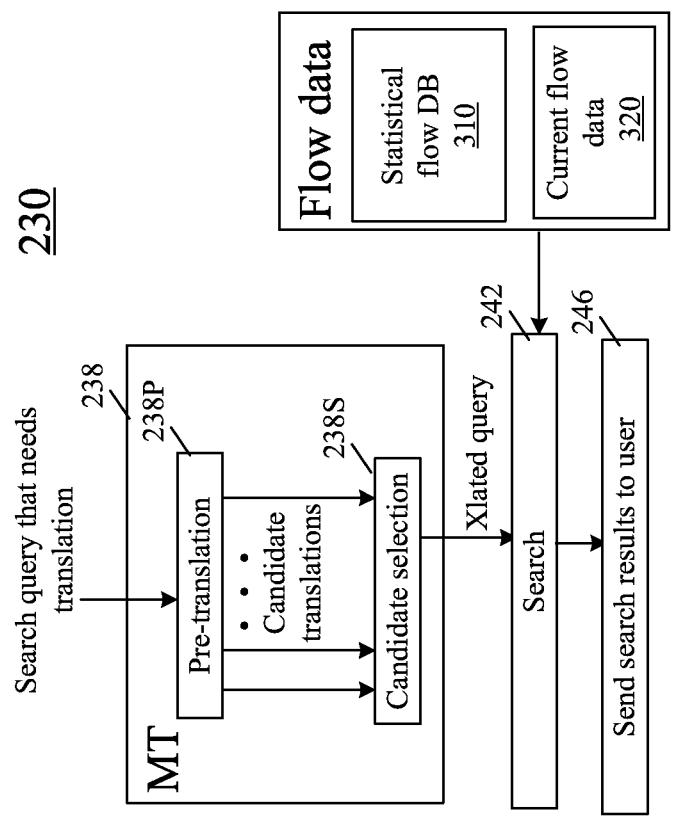
FIGS. 12, 13, 14 include flowcharts of server operations according to some implementations introduced by the present disclosure.

Flow data can be used to modify other parts of the server operation, e.g. the search as shown in FIG. 12. For example, before performing a search on a query, some search engines expand the query to include synonyms, morphological variants, alternate spellings (or misspellings), spelling corrections, and possibly other variants. In some embodiments, the expansion of the translated query takes into account flow data 310, 320. For example, in generating statistical flow DB 310, and more particularly in determining various correlations, DM 190 may discover that certain kinds of expansions in combination with certain flow parameters are highly likely to provide low success indicators ("highly likely" in the statistical sense). In an example, suppose that a translated query includes the word "sheet", and click-through DB 180 shows that the word "sheet" has been expanded as "sheets", "sheeting", "scheet" (misspelling) and "coating" by the search engine 150. DM 190 also finds that search engine 150 has returned certain documents in response to "sheeting", and these documents did not have other variants (such as "sheet", "sheets", etc.), and these documents were never requested by the user except if the prior domains (preceding the query) included the "gardening" domain, or these documents were requested but provided low success indicators except for flows with the "gardening" domain prior to the query. Then DB 310 generated by DM 190 may indicate that the "sheeting" expansion must not be used unless there is the gardening domain in flow 320.

The techniques of FIG. 12 can be combined with those of FIGS. 4, 9 and 11. For example, in FIGS. 9 and 11, the searches at step 242 can be modified by the flow data 310, 320 as in FIG. 12.

Figure 13:
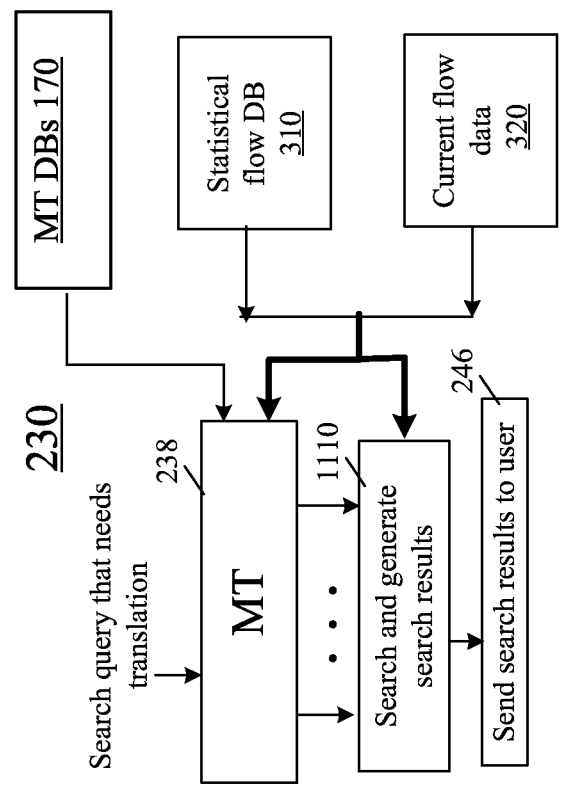

FIG. 13 illustrates the versatility of some of the methods described above. At step 238, MT engine 160 provides one or more translations to search engine 150. Step 238 could generate a single translation or multiple candidate translations (as in FIGS. 4-12 for example). In any case, the translation or translations may take into account statistical flow data 310 and current flow data 320, in a manner described above or in some other way. For example, as described in the aforementioned Sawaf reference, a machine translation may use dictionaries, and a separate dictionary can be provided for each domain. In some embodiments of the present invention, the domains are taken from current flow data 320, possibly taking into account the statistical flow data 310. For example, suppose that in the process of FIG. 5, DM 190 discovers a high correlation between success indicators and the domains with high relative frequencies where a relative frequency is the number of occurrences of the domain in the flow as a percentage of all the occurrences of all the domains in the flow. Thus, DM 190 may discover that there is a high correlation between success indicators and the domains whose relative frequencies are above 40%, but not the domains with relative frequencies of 40% or below. In this case, in some embodiments, MT engine 160 will limit the domains to the relative frequencies above 40% (if such domains are present in the current flow based on data 320) when selecting the dictionaries and/or performing other translation operations.

At step 1110, the search engine 150 performs a search for each translation received from step 238, possibly taking into account the flow data 310, 320 (e.g. as at step 242 in FIG. 12). If step 238 provides multiple candidate translations, then the partial search results are combined, possibly taking into account the flow data 310 and 320. Flow data 310 and 320 can be taken into account at step 238 but not 1110, or at step 1110 but not 238, or at both steps 238 and 1110.

Step 246 is as described above.

Figure 14:
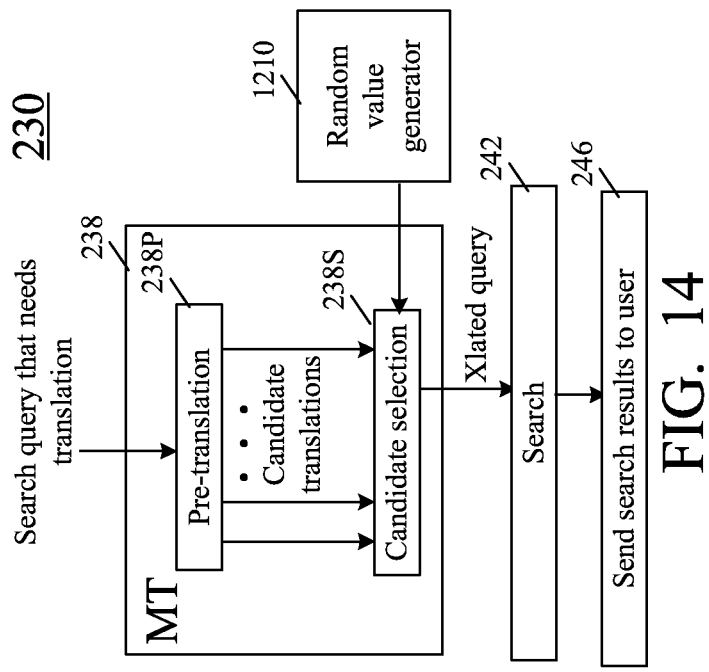

As mentioned above, some embodiments generate random values that can be used, for example, for multivariate testing. FIG. 14 illustrates an embodiment including a random value generator 1210. In this embodiment, the MT engine 160 includes a pre-translation engine 238P which may be as described above for FIG. 4. The candidate selection may normally be as in FIG. 4 or as in any embodiment described above, or as in prior art. However, when the random option is selected, normal operation is suspended, and the candidate selection is performed based on a random value generated by random value generator 1210. Random option can be selected or deselected by a human operator of server 110 who may access the server through a user interface device (not shown) connected to the server or to another computer in network communication with the server. In some embodiments, the human operator may specify that the random option is applicable only to certain specified queries or classes or queries (e.g. based on the location of the user sending the query or some other parameter), or for a given word or words or expression(s) in the query. Any other factors can be specified as defining when the random option is to be exercised, including for example user properties (gender, occupation, etc. if known), user location, and possibly any parameters of flow data 310 and/or 320.

With either normal or random option, the selected candidate is searched at step 242, and the search results are provided to the user at step 246. These steps can be as in FIG. 4.

In some embodiments, for each multivariate testing operation (i.e. when the random option is used), the use of random option is specified in click-through DB 180 (e.g. in the L-data of FIG. 8), to allow subsequent analysis of correlations between the query, the selected translation, the corresponding success indicators, and any factors such as described above (gender, location, etc.). For example, the analysis can be performed by DB 190 as in FIG. 5 or other embodiments described above; the resulting statistical flow data 310 will lead to selection of the best translation of the query in subsequent normal operation performed according to the scheme of FIG. 4 or other schemes described above. When the testing is completed, the random option can be disabled.

The random option can be used in other embodiments described above to perform testing. For example, referring to FIG. 9, the CT prioritization scheme of FIG. 10 can be suspended for selected queries or other selected sets of conditions such as described above for FIG. 14, and at step 810 the search results can be combined based on a random value or values generated for the testing operation (by a random value generator such as 1210 in FIG. 14). The remaining operation can be as described above for FIG. 14.

Likewise, in FIG. 11, for a testing operation, the normal scheme based on operation of CT prioritization module 160S as described above can be suspended for step 238S or 810 or both, and instead the random value scheme can be used as described above for FIG. 4 (i.e. FIG. 14) or FIG. 9 or both.

Similarly, referring to FIG. 13, the testing operation can be performed by using random value generation at step 238 or 1110 or both instead of the normal scheme.

Random values can be combined with other information (e.g. user flow information) to determine the best translation and/or arrange the results. For example, random values can be used to provide weights for the scores Sc(CT) in a testing operation; then in subsequent normal operation, the machine translation's score generation can be updated based on the testing operation.

The invention is not limited to search queries but applies to any processing involving a machine translation. For example, suppose a user request involves a translation of any text, e.g. a document which may be a science or engineering article, a literary story, or any other type of text. The user request may include a request to send the translation to the user, or to perform searching or other tasks based on the translations. Click-through data 180, the resulting statistical flow data 320, and current flow data 310 can be used in a manner described above to affect various stages of the machine translation(s) of the whole or a portion of the text, and/or searching, and/or results presentation to the user, and/or other tasks involving use of the machine translation. Such tasks can also be in a multivariate testing mode with normal operation suspended, and the AB-testing data can be used to improve subsequent normal operation as discussed above in connection with FIG. 13.

The invention is not limited to the features and advantages described above. For example, various tasks described above as performed by server 110 (translations, searches, etc.) can be split between the server and the computer 120 sending requests to the server; for instance, part of the translation work can be performed by the computer 120. Further, the invention is not limited to computer networks; server 110 can be replaced by a computer system that receives requests via a user interface device (e.g. a keyboard, a mouse, a touchscreen, or some other device) without intermediacy of a computer network.

Each computer in any computer system involved herein comprises one or more computer processors executing computer instructions stored in a computer storage (e.g. a computer readable medium such as a magnetic or optical disk, a semiconductor memory, or of other kind. The data such as 180, 310, 320, and other data are stored in such computer storage and read from or written to such storage as needed to perform tasks described herein.

Other embodiments and variations are within the scope of the invention, as defined by the appended claims.

BIBLIOGRAPHY

The documents [1] through [14], listed in this section, are hereby incorporated herein by reference.

[1] Tan P. N., Kumar V., Srivastav J., "Selecting the right interestingness measure for association pattern", 8th ACM SIGKDD International Conference on KDD, 2001, San Francisco USA 67-76.

[2] V. Umarani, Dr. M. Punithavalli, "A STUDY ON EFFECTIVE MINING OF ASSOCIATION RULES FROM HUGE DATABASES", IJCSR International Journal of Computer Science and Research, Vol. 1 Issue 1, 2010 ISSN: 2210-9668.

[3] S. M. Kamruzzaman, Farhana Haider, Ahmed Ryadh Hasan, "Text Classification Using Data Mining", ICTM 2005, available on the Internet at http://arxiv.org/pdf/1009.4987.pdf

[4] Navin Kumar Tyagi, A. K. Solanki, "Prediction of Users Behavior through Correlation Rules", (IJACSA) International Journal of Advanced Computer Science and Applications, Vol. 2, No. 9, 2011, pages 77-81, available at http://www.thesai.org/downloads/Volume2No9/Paper%2013%20-%20Prediction%20of%20Users%20Behavior%20through%20Correlation%20Rules.pdf

[5] Eytan Adar, Daniel S. Weld, Brian N. Bershad, Steven D. Gribble, "Why We Search: Visualizing and Predicting User Behavior", Copyright is held by the International World Wide Web Conference, Committee (IW3C2); WWW 2007, May 8-12, 2007, Banff, Alberta, Canada. ACM 978-1-59593-654-7/07/0005. available at http://www.cond.org/www520-adar.pdf

[6] Eugene Agichtein, Eric Brill, Susan Dumais, "Improving Web Search Ranking by Incorporating User Behavior Information", SIGIR'06, Aug. 6-11, 2006, Seattle, Wash., USA; Copyright 2006 ACM 1-59593-369-7/06/0008; available at http://www.mathcs.emory.edu/~eugene/papers/sigir2006ranking.pdf

[7] Adriano V. Barbosa, Martin A. Oberg, Rose-Marie Déchaine, Eric Vatikiotis-Bateson, "An Instantaneous Correlation Algorithm for Assessing Intra and Inter Subject Coordination During Communicative Behavior", Workshop on Modeling Human Communication Dynamics at NIPS 2010, pages 38-41. Available at http://projects.ict.usc.edu/mhcd2010/hcd-barbosa.pdf

[8] Dong Wang, Weizhu Chen, Gang Wang, Yuchen Zhang, Botao Hu, "Explore Click Models for Search Ranking", CIKM'10, Oct. 26-30, 2010, Toronto, Ontario, Canada. Copyright 2010 ACM 978-1-4503-0099-5/10/10. Available at http://www.cs.berkeley.edu/~yuczhang/files/cikm10_ranking.pdf

[9] Steve Fox, Kuldeep Karnawat, Mark Mydland, Susan Dumais, and Thomas White, "Evaluating Implicit Measures to Improve Web Search". Available at http://research.microsoft.com/en-us/um/people/sdumais/cbarticle-final.pdf

[10] Sandeep Pandey, Mohamed Aly, Abraham Bagherjeiran, Andrew Hatch, Peter Ciccolo, Adwait Ratnaparkhi, Martin Zinkevich, "Learning to Target: What Works for Behavioral Targeting", CIKM'11, Oct. 24-28, 2011, Glasgow, Scotland, UK. Copyright 2011 ACM 978-1-4503-0717-8/11/10. Available at http://labs.yahoo.com/files/learning%20to%20target.pdf

[11] U.S. Pat. No. 8,793,120.

[12] U.S. Pat. No. 8,543,580.

[13] Andrii Shelestov, Serhiy Skakun, Olga Kussul, "COMPLEX NEURAL NETWORK MODEL OF USER BEHAVIOR IN DISTRIBUTED SYSTEMS", International Conference «Knowledge-Dialogue-Solutions» 2007. Available at http://inform.ikd.kiev.ualcontent/ua/publications/articles/content/KDS07-Shelestov_Skakun_Kussul.pdf

[14] Pao-Hua Chou, Pi-Hsiang Li, Kuang-Ku Chen, Menq-Jiun Wu, "Integrating web mining and neural network for personalized e-commerce automatic service", Expert Systems with Applications 37 (2010) 2898-2910. Available at http://csnotes.upm.edu.my/kelasmaya/pgkm20910.nsf/de8cc2082fc4d31b4825730e002bd111/1f41e6ddc7f55f6b482577760014ca84/$FILE/WEB-MINING-E-COMMERCE-2010.pdf

The invention claimed is:

1. A method comprising:
 (A) obtaining statistical flow data for a plurality of flows, each of the plurality of flows comprising a flow of computer actions performed by one or more computer systems in response to one or more previous requests, at least some of the computer actions comprising machine translations, wherein the statistical flow data is stored in statistical flow data records comprising:
  (i) translations from a machine translation (MT) performed in response to a request from the one or more previous requests,
  (ii) one or more flow parameters defined at least in part by a portion of a flow before the MT, and
  (iii) one or more success parameters defined at least in part by a portion of the flow after the MT, wherein the one or more success parameters comprise measures of interest during a click-through navigation of websites providing items or services associated with the request;
 (B) receiving a first request in a first flow of computer actions;
 (C) obtaining one or more first flow parameters for the first flow, wherein at least one first flow parameter is at least partially defined by a click-through navigation portion of the first flow before receiving the first request; and
 (D) performing a first MT, wherein the first MT matches the one or more first flow parameters with the one or more flow parameters in the statistical flow data records and produces a result used in performing the first MT specific to the measures of interest in the statistical flow data records.

2. The method of claim 1, wherein performing the first MT generates a plurality of candidate translations, and wherein the matches are used to select one or more, but less than all, of the candidate translations for subsequent use.

3. The method of claim 2, further comprising:
performing a search on the one or more selected candidate translations.

4. The method of claim 1, further comprising:
generating, using the first MT, a plurality of candidate translations;
performing a search on at least two of the candidate translations; and
arranging search results based on the first MT match.

5. The method of claim 1, wherein at least one first value is at least partially defined by a document appearing in the portion of the first flow before receiving the first request.

6. A method comprising:
(A) obtaining statistical flow data for a plurality of flows, each of the plurality of flows comprising a flow of computer actions performed by one or more computer systems, at least some of the computer actions comprising machine translations, wherein the statistical flow data is stored in statistical flow data records comprising:
 (i) translations from a machine translation (MT) in the flow containing a MT of a previously submitted text,
 (ii) one or more flow parameters defined at least in part by a portion of the flow before the MT, the one or more flow parameters being unrelated to the previously submitted text, and
 (iii) one or more success parameters defined at least in part by the portion of the flow after the MT, wherein the one or more success parameters comprise measures of interest during a click-through navigation of websites providing items or services associated with the previously submitted text;
(B) receiving a first text in a first flow of computer actions;
(C) obtaining one or more first flow parameters for the first flow, wherein at least one first flow parameter is at least partially defined by a click-through navigation portion of the first flow before receiving the first text; and
(D) performing a MT of the first text, wherein the MT matches the one or more first flow parameters in the statistical flow data records and produces a result used in performing the MT of the first text specific to the measures of interest in the statistical flow data records.

7. The method of claim 6, wherein performing the MT of the first text generates a plurality of candidate translations, and wherein the MT matches are selects one or more, but less than all, of the candidate translations for subsequent computer use.

8. The method of claim 7, further comprising: performing a search on the one or more selected candidate translations.

9. The method of claim 6, further comprising:
generating, using the MT of the first text, a plurality of candidate translations;
performing a search on at least two of the candidate translations; and
arranging search results based on the match.

10. The method of claim 6, wherein at least one first value is at least partially defined by a document unrelated to the first text and appearing in the portion of the first flow before performing the MT of the first text.

11. A method comprising:
(A) obtaining click-through data for a plurality of flows, each of the plurality of flows comprising a flow of computer actions performed by one or more computer systems in response to one or more previously submitted requests, each of the plurality of flows further comprising a click-through navigation during the one or more previously submitted requests to websites providing items or services, at least some of the computer actions comprising machine translations;
(B) obtaining, from the click-through data, statistical flow data which define, for the plurality of flows, the statistical flow data stored in statistical flow data records comprising:
 (i) translations from a machine translation (MT) performed in response to a request from the one or more previously submitted requests,
 (ii) one or more flow parameters defined at least in part by a portion of the flow before the request from the one or more previously submitted requests, and
 (iii) one or more success parameters defined at least in part by the portion of the flow after the MT, wherein the one or more success parameters comprise measures of interest during a click-through navigation of websites associated with the request; and
(C) generating, using the MT, at least one search result for a current request in a current flow by matching one or more parameters in a click-through navigation portion of the current flow prior to the current request with the one or more flow parameters, wherein the at least one search result is specific to the measures of interest in the statistical flow data records.

12. A method comprising a first computer system performing operations of:
(A) obtaining click-through data for a plurality of flows each of the plurality of flows comprising a flow of computer actions performed by one or more computer systems, each of the plurality of flows further comprising click-through navigation during requests to websites providing items or services, at least some of the computer actions comprising machine translations;
(B) obtaining, from the click-through data, statistical flow data stored in statistical flow data records comprising:
 (i) outputs of a machine translation (MT) of a previously submitted text,
 (ii) one or more flow parameters defined at least in part by a portion of the flow before the MT, the one or more flow parameters being unrelated to the previously submitted text, and
 (iii) one or more success parameters defined at least in part by the portion of the flow after the MT, wherein the one or more success parameters comprise measures of interest during a click-through navigation of websites associated with the previous submitted text; and
(C) generating, using the MT, at least one search result for text in a request included in a current flow by matching one or more parameters in a click-through navigation portion of the current flow prior to the request with the one or more flow parameters, wherein the at least one search result is specific to the measures of interest in the statistical flow data records.

13. A first computer system comprising:
a non-transitory memory; and
one or more hardware processors coupled to the non-transitory memory and configured to read instructions from the non-transitory memory to cause the first computer system to perform operations comprising:
 obtaining statistical flow data for a plurality of flows, each of the plurality of flows comprising a flow of computer actions performed by one or more computer systems in response to one or more previously submitted requests, at least some of the computer actions comprising machine translations, wherein the statistical flow data is stored in statistical flow data records comprising:
- (i) outputs of a machine translation (MT) performed in response to a request from the previously submitted requests,
- (ii) one or more flow parameters defined at least in part by a portion of a flow before the request, and
- (iii) one or more success parameters defined at least in part by a portion of a flow after the MT, wherein the one or more success parameters comprise measures of interest during a click-through navigation of websites providing items or services associated with the request;

receiving a first request in a first flow of computer actions;

obtaining one or more first flow parameters for the first flow, wherein at least one first flow parameter is at least partially defined by a click-through navigation portion of the first flow before receiving the first request; and performing a first MT, wherein the first MT matches the one or more first flow parameters with one or more first flow parameters in the statistical flow data records and produces a result used in performing the first MT specific to the measure of interest in the statistical flow data records.

14. The first computer system of claim 13, wherein the operations further comprise:
generating, using the first MT, a plurality of candidate translations; and
selecting one or more, but less than all, of the candidate translations.

15. The first computer system of claim 14, wherein the operations further comprise performing a search on the one or more selected candidate translations.

16. The first computer system of claim 13, wherein the operations further comprise:
generating, using the first MT, a plurality of candidate translations; and
performing a search on at least two of the candidate translations that generates search results.

17. The first computer system of claim 13, wherein at least one first value is at least partially defined by a document appearing in the portion of the first flow before receiving the first request.

18. A first computer system comprising:
a non-transitory memory; and
one or more hardware processors coupled to the non-transitory memory and configured to read instructions from the non-transitory memory to cause the first computer system to perform operations comprising:
- (A) obtaining statistical flow data for a plurality of flows, each of the plurality of flows comprising a flow of computer actions performed by one or more computer systems, at least some of the computer actions comprising machine translations, wherein the statistical flow data is stored in statistical flow data records comprising:
  - (i) translations from a machine translation (MT) of a previously submitted text,
  - (ii) one or more flow parameters defined at least in part by a portion of the flow before the MT, the one or more flow parameters being unrelated to the previously submitted text, and
  - (iii) one or more success parameters defined at least in part by the portion of the flow after the MT, wherein the one or more success parameters comprise measures of interest during a click-through navigation of websites providing items or services associated with the previously submitted text;
- (B) receiving a first text in a first flow of computer actions;
- (C) obtaining one or more first flow parameters for the first flow, wherein at least one first flow parameter is at least partially defined by a click-through navigation portion of the first flow before receiving the first text; and
- (D) performing an MT of the first text, wherein the MT matches the one or more first flow parameters with the one or more flow parameters in the statistical flow data records and specific to the measures of interest in the statistical flow data records.

19. The first computer system of claim 18, wherein the operations further comprise:
generating, using the MT a plurality of candidate translations; and
wherein the match selects one or more, but less than all, of the candidate translations.

20. The first computer system of claim 19, wherein the operations further comprise:
performing a computer search on the one or more selected candidate translations.

21. The first computer system of claim 18, wherein the operations further comprise:
generating, using the MT, a plurality of candidate translations;
performing a computer search on at least two of the candidate translations; and
arranging search results based on the MT match.

22. The first computer system of claim 18, wherein at least one first value is at least partially defined by a document unrelated to the first text and appearing in the first flow's portion before performing the MT of the first text.

23. A first computer system comprising:
a non-transitory memory; and
one or more hardware processors coupled to the non-transitory memory and configured to read instructions from the non-transitory memory to cause the first computer system to perform operations comprising:
- (A) obtaining click-through data for a plurality of flows, each of the plurality of flows comprising a flow of computer actions performed by one or more computer systems in response to one or more previously submitted requests, each of the plurality of flows further comprising a click-through navigation during the one or more previously submitted requests to websites providing items or services, at least some of the computer actions comprising machine translations;
- (B) obtaining, from the click-through data, statistical flow data stored in statistical flow data records comprising:
  - (i) outputs of a machine translation (MT) in the flow containing a MT performed in response to a request from the one or more previously submitted requests,
  - (ii) one or more flow parameters defined at least in part by a portion of the flow before the request, and
  - (iii) one or more success parameters defined at least in part by the portion of the flow after the MT, wherein the one or more success parameters comprise measures of interest during a click-through navigation of websites associated with the request; and (C) generating, using the MT, at least one search result for a current request in a current flow by matching the one or more flow parameters in the statistical flow data records and one or more flow parameters in a click-through navigation portion of the current flow prior to the current request, wherein the at least one search result is specific to the measures of interest in the statistical flow data records.

24. A first computer system comprising:
a non-transitory memory; and
one or more hardware processors coupled to the non-transitory memory and configured to read instructions from the non-transitory memory to cause the first computer system to perform operations comprising:
(A) obtaining click-through data for a plurality of flows, each of the plurality of flows comprising a flow of computer actions performed by one or more computer systems, each of the plurality of flows further comprising click-through navigation during previous requests to websites providing items or services, at least some of the computer actions comprising machine translations;
(B) obtaining, from the click-through data, statistical flow data stored in statistical flow data records comprising:
(i) outputs of a machine translation (MT) of a text from the previous requests,
(ii) one or more flow parameters defined at least in part by a portion of the flow before the MT, the one or more flow parameters being unrelated to the text, and
(iii) one or more success parameters defined at least in part by the portion of the flow after the MT, wherein the one or more success parameters comprise measures of interest during a click-through navigation of websites associated with the text from the previous requests, for flows containing machine translations; and
(C) generating, using the MT, at least one search result for a request in a current flow by matching the one or more flow parameters in the statistical flow data records and one or more flow parameters in a click-through navigation portion of the current flow prior to the request, wherein the at least one search result is specific to the measures of interest in the statistical flow data records.

25. A non-transitory machine readable medium having stored thereon machine readable instructions executable to cause a machine to perform operations comprising:
obtaining statistical flow data for a plurality of flows each of which comprises a flow of computer actions performed by one or more computer systems in response to one or more previous requests, at least some of the computer actions comprising machine translations, wherein the statistical flow data is stored in statistical flow data records comprising one or more flow parameters defined at least in part by a portion of a flow before the machine translation (MT) and one or more success parameters defined at least in part by a portion of a flow after the MT performed in response to a request from the previous requests, wherein the one or more success parameters comprise measures of interest during a click-through navigation of websites providing items or services associated with the request;

receiving a first request in a first flow of computer actions;
obtaining one or more first flow parameters for the first flow, wherein at least one first flow parameter is at least partially defined by a click-through navigation portion of the first flow before receiving the first request; and
performing, responsive to the first request, a first MT, wherein the first MT matches the one or more first flow parameters with one or more flow parameters in the statistical flow data records and produces a result used in performing the first MT specific to the measures of interest in the statistical flow data records.

26. The non-transitory machine readable medium of claim 25, wherein the operations further comprise:
generating, using the first MT, a plurality of candidate translations; and
selecting one or more, but less than all, of the candidate translations.

27. The non-transitory machine readable medium of claim 26, wherein the operations further comprise:
performing a search on the one or more selected candidate translations.

28. The non-transitory machine readable medium of claim 25, wherein the operations further comprise:
generating a plurality of candidate translations;
performing a search on at least two of the candidate translations; and
arranging search results based on the MT match.

29. The non-transitory machine readable medium of claim 25, wherein at least one first value is at least partially defined by a document appearing in the portion of the first flow before receiving the first request.

30. A non-transitory machine readable medium having stored thereon machine readable instructions executable to cause a machine to perform operations comprising:
(A) obtaining statistical flow data for a plurality of flows, each of the plurality of flows comprising a flow of computer actions performed by one or more computer systems, at least some of the computer actions comprising machine translations, wherein the statistical flow data are stored in statistical flow data records comprising: one or more flow parameters defined at least in part by a portion of a flow before the machine translation (MT) of a previously submitted text and one or more success parameters defined at least in part by a portion of a flow after the MT of the previously submitted text, wherein the one or more success parameters comprise measures of interest during a click-through navigation of websites providing items or services associated with the previously submitted text;
(B) receiving a first text in a first flow of computer actions;
(C) obtaining one or more first flow parameters for the first flow, wherein at least one first flow parameter is at least partially defined by a click-through navigation portion of the first flow before receiving the first text; and
(D) performing an MT of the first text, wherein the MT matches the one or more first flow parameters with the one or more flow parameters in the statistical flow data records and produces a result used in performing the MT of the first text specific to the measures of interest in the statistical flow data records.

31. The non-transitory machine readable medium of claim 30, wherein the operations further comprise:
generating, using the MT of the first text, a plurality of candidate translations; and
selecting one or more of the candidate translations.

32. The non-transitory machine readable medium of claim 31, wherein the operations further comprise performing a search on the one or more selected candidate translations.

33. The non-transitory machine readable medium of claim 30, wherein the operations further comprise:
generating a plurality of candidate translations;
performing a computer search on at least two of the candidate translations; and arranging search results based on the match.

34. The non-transitory machine readable medium of claim 30, wherein at least one first value is at least partially defined by a document unrelated to the first text and appearing in the first flow's portion before performing the MT of the first text.

35. A non-transitory machine readable medium having stored thereon machine readable instructions executable to cause a machine to perform operations comprising:
(A) obtaining click-through data for a plurality of flows, each of the plurality of flows comprising a flow of computer actions performed by one or more computer systems in response to one or more requests, each of the plurality of flows further comprising a click-through navigation during the one or more from the previously submitted one or more requests to websites providing items or services, at least some of the computer actions comprising machine translations;
(B) obtaining, from the click-through data, statistical flow data stored in statistical flow data records comprising one or more flow parameters defined at least in part by a portion of a flow before the machine translation (MT) and one or more success parameters defined at least in part by a portion of a flow after a machine translation (MT) performed in response to a request from the previously submitted one or more requests, wherein the one or more success parameters comprise measures of interest during a click-through navigation of websites associated with the request; and
(C) generating, using the MT, at least one search result for a current request in a current flow by matching the one or more flow parameters in the statistical flow data records and one or more flow parameters in a click-through navigation portion of the current flow prior to the current request.

36. A non-transitory machine readable medium having stored thereon machine readable instructions executable to cause a machine to perform operations comprising:
(A) obtaining click-through data for a plurality of flows, each of the plurality of flows comprising a flow of computer actions performed by one or more computer systems, each of the plurality of flows further comprising click-through navigation during previously submitted requests to websites providing items or services, at least some of the computer actions comprising machine translations;
(B) obtaining, from the click-through data, statistical flow data stored in statistical flow data records comprising one or more flow parameters defined at least in part by a portion of a flow before the machine translation (MT) and one or more success parameters defined at least in part by a portion of a flow after a machine translation (MT) of a text from the previously submitted requests, wherein the one or more success parameters comprise measures of interest during a click-through navigation of websites associated with the text from the previously submitted requests; and
(C) generating, using the MT, at least one search result for a request in a current flow, by matching the one or more flow parameters in the statistical flow data records and one or more flow parameters in a click-through navigation portion of the current flow prior to the request.

* * * * *